United States Patent
Downs et al.

(10) Patent No.: US 8,190,541 B2
(45) Date of Patent: May 29, 2012

(54) DETERMINING RELEVANT INFORMATION FOR DOMAINS OF INTEREST

(75) Inventors: Oliver B. Downs, Redmond, WA (US); Michael Sandoval, Kirkland, WA (US); Claudiu Alin Branzan, Timisoara (RO); Vlad Mircea Iovanov, Arad (RO); Sopurkh Singh Khalsa, Bellevue, WA (US); Radu Ioan Bisca, Coquitlam (CA); Catalin Teodor Milos, Timisoara (RO)

(73) Assignee: Atigeo LLC, Bellevue, WA (US)

( * ) Notice: Subject to any disclaimer, the term of this patent is extended or adjusted under 35 U.S.C. 154(b) by 630 days.

(21) Appl. No.: 12/392,933

(22) Filed: Feb. 25, 2009

(65) Prior Publication Data

US 2009/0216696 A1 Aug. 27, 2009

Related U.S. Application Data

(60) Provisional application No. 61/067,162, filed on Feb. 25, 2008, provisional application No. 61/122,282, filed on Dec. 12, 2008.

(51) Int. Cl.
*G06F 15/18* (2006.01)
*G06E 1/00* (2006.01)
*G06E 3/00* (2006.01)
*G06G 7/00* (2006.01)

(52) U.S. Cl. ........................................................ 706/20
(58) Field of Classification Search ..................... 706/20
See application file for complete search history.

(56) References Cited

U.S. PATENT DOCUMENTS

| | | | |
|---|---|---|---|
| 7,801,901 B2 * | 9/2010 | Surendran | 707/748 |
| 2002/0129014 A1 | 9/2002 | Kim et al. | |
| 2006/0122994 A1 | 6/2006 | Kapur et al. | |
| 2007/0106659 A1 | 5/2007 | Lu et al. | |
| 2007/0266019 A1 | 11/2007 | Lavi | |
| 2008/0009268 A1 | 1/2008 | Ramer et al. | |
| 2008/0104048 A1 * | 5/2008 | Surendran | 707/5 |

OTHER PUBLICATIONS

Fiaidhi, J. et al., "A Standard Framework for Personalization Via Ontology-Based Query Expansion," Pakistan Journal of Information and Technology, 2 (2): pp. 96-103, 2003, retrieved on Feb. 24, 2009, from http://www.scialert.net/pdfs/itj/2003/96-103.pdf?sess=jJghHkjfd76K8JKHgh76JG7FHGDredhgJgh7GkjH7G-kjg57KJhT&userid=jhfgJKH78Jgh7GkjH7Gkjg57KJhT68JKHgh76JG7Ff.

(Continued)

*Primary Examiner* — Michael B Holmes
(74) *Attorney, Agent, or Firm* — Seed IP Law Group PLLC

(57) ABSTRACT

Techniques are described for determining and using relevant information related to domains of interest. In at least some situations, the techniques include automatically analyzing documents, terms and other information related to a domain of interest in order to automatically determine information about relevant themes within the domain and/or about which documents have contents that are relevant to such themes. Such automatically determined information related to a domain may then be used in various ways, including to assist users in specifying themes of interest and/or in obtaining documents and/or document fragments with contents that are relevant to specified themes. In addition, information about how the automatically determined information is used by users may be tracked and used as feedback for learning improved determinations of relevant themes and relevant documents within the domain, such as by using automated machine learning techniques.

48 Claims, 16 Drawing Sheets

OTHER PUBLICATIONS

Riezler, S. et al., "Statistical Machine Translation for Query Expansion in Answer Retrieval," retrieved on Feb. 24, 2009, from http://www.scialert.net/pdfs/itj/2003/96-103.pdf?sess=jJghHkjfd76K8JKHgh76JG7FHGDredhgJgh7GkjH7Gkjg57KjhT&userid=jhfgJKH78Jgh7GkjH7Gkjg57KJhT68JKHgh76JG7Ff, 8 pages.

Amazon.Com, Statistically Improbable Phrases, retrieved on Feb. 24, 2009, from http://www.amazon.com/gp/search-inside/sipshelp.html, 1 page.

Choicestream.com, About ChoiceStream, retrieved on Feb. 24, 2009, from http://www.choicestream.com/company/, 2 pages.

Matchmine.com, Frequently Asked Questions, retrieved on Feb. 24, 2009, from http://web.archive.org/web/20071026055031m_1/www.matchmine.com/help/, 2 pages.

Peltarion, Applications of Adaptive Systems, retrieved on Feb. 24, 2009, from http://www.peltarion.com/doc/index.php?title=Applications_of_adaptive_systems, 7 pages.

Strands, Company Overview, retrieved on Feb. 24, 2009, from http://corp.strands.com/, 1 page.

Strands, History and Name, retrieved on Feb. 24, 2009, from http://corp.strands.com/history, 2 pages.

Query Expansion—Wikipedia, retrieved on Feb. 24, 2009, from http://en.wikipedia.org/wiki/Query_expansion, 3 pages.

Recommender System—Wikipedia, retrieved on Feb. 24, 2009, from http://en.wikipedia.org/wiki/Recommendation_engine, 4 pages.

tf-idf—Wikipedia, retrieved on Feb. 24, 2009, from http://en.wikipedia.org/wiki/Tf-idf, 3 pages.

* cited by examiner

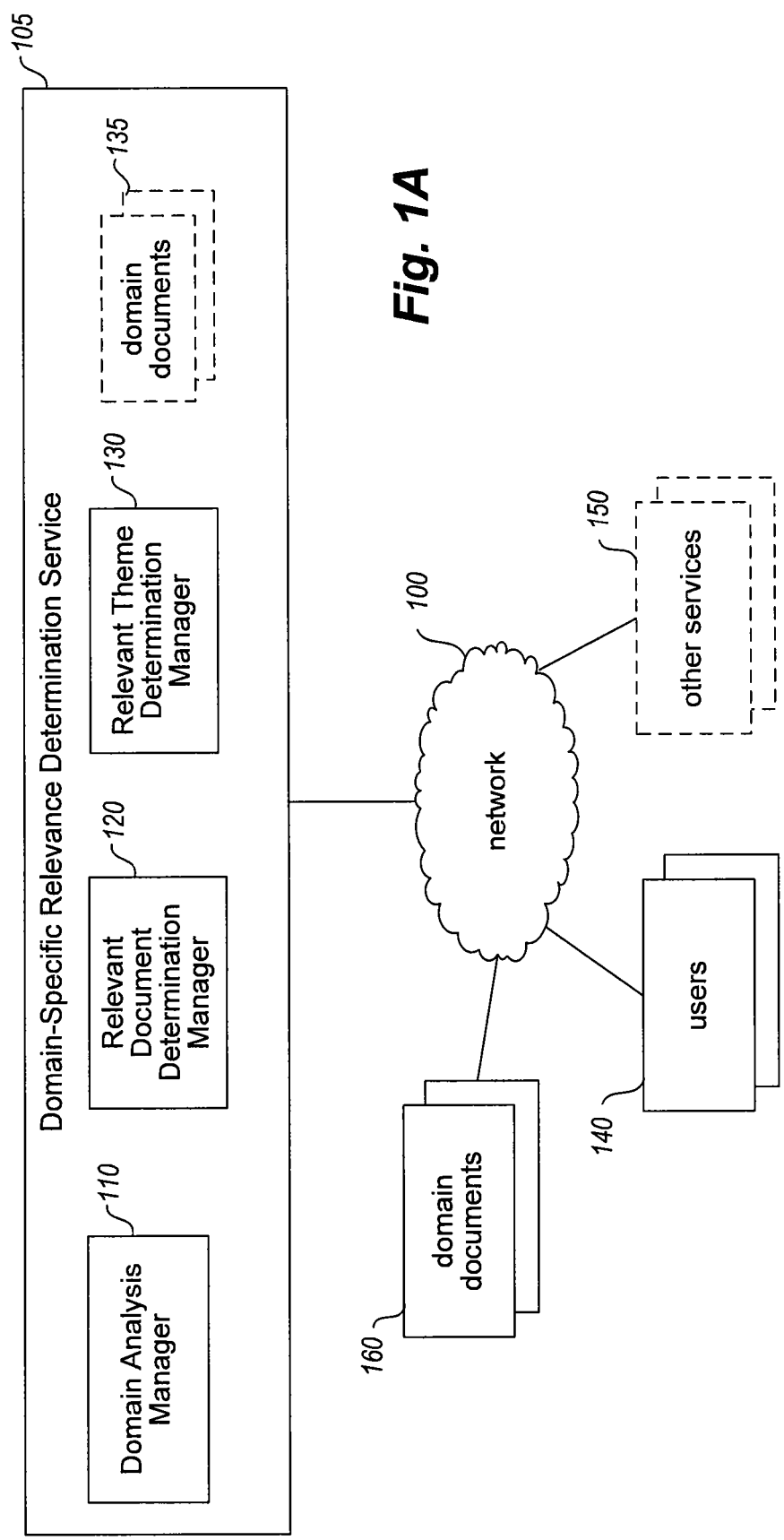

Example Document Corpus (1000 Baseball-Related Documents)

200

| | 202a | 202b | 202c | 202d |
|---|---|---|---|---|
| | Terms | Term ID | Number Of Documents | IDF |
| 204a | the | 1 | 1000 | 0.00 |
| 204b | baseball | 2 | 980 | 0.01 |
| 204c | home run | 3 | 100 | 1.00 |
| 204d | Bonds | 4 | 80 | 1.10 |
| 204e | Barry | 5 | 79 | 1.10 |
| 204f | Bobby | 6 | 40 | 1.40 |
| 204g | Giants | 7 | 60 | 1.22 |
| 204h | steroids | 8 | 40 | 1.40 |
| 204i | indictment | 9 | 25 | 1.60 |
| 204j | Hank Aaron | 10 | 10 | 2.00 |
| | ... | | | |

Example Document 1 (Bonds HR Record)

210

| | 212a | 212b | 212c | 212d | 212e |
|---|---|---|---|---|---|
| | Terms | Occurrences | TF (%) | IDF | TF-IDF |
| 214a | Bonds | 35 | 2.33 | 1.10 | 2.559 |
| 214b | home run | 20 | 1.33 | 1.00 | 1.333 |
| 214c | Hank Aaron | 5 | 0.33 | 2.00 | 0.667 |
| 214d | Giants | 5 | 0.33 | 1.22 | 0.407 |
| 214e | Barry | 5 | 0.33 | 1.10 | 0.367 |
| 214f | steroids | 3 | 0.20 | 1.40 | 0.280 |
| 214g | Bobby | 1 | 0.07 | 1.40 | 0.093 |
| 214h | baseball | 6 | 0.40 | 0.01 | 0.004 |
| 214i | the | 100 | 6.67 | 0.00 | 0.000 |
| 214j | indictment | 0 | 0.00 | 1.60 | 0.000 |
| | ... | | | | |
| 214z | TOTAL | 1500 | | | |

Example Document 2 (Barry Bonds Biography)

220

| | 222a | 222b | 222c | 222d | 222e |
|---|---|---|---|---|---|
| | Terms | Occurrences | TF (%) | IDF | TF-IDF |
| 224a | Bonds | 30 | 1.88 | 1.10 | 2.057 |
| 224b | home run | 18 | 1.13 | 1.00 | 1.125 |
| 224c | Hank Aaron | 3 | 0.19 | 2.00 | 0.375 |
| 224d | Giants | 4 | 0.25 | 1.22 | 0.305 |
| 224e | Barry | 4 | 0.25 | 1.10 | 0.276 |
| 224f | Bobby | 2 | 0.13 | 1.40 | 0.175 |
| 224g | steroids | 2 | 0.13 | 1.40 | 0.175 |
| 224h | baseball | 10 | 0.63 | 0.01 | 0.005 |
| 224i | indictment | 0 | 0.00 | 1.60 | 0.000 |
| 224j | the | 110 | 6.88 | 0.00 | 0.000 |
| | ... | | | | |
| 224z | TOTAL | 1600 | | | |

Example Document 3 (Bonds Indictment)

230

| | 232a | 232b | 232c | 232d | 232e |
|---|---|---|---|---|---|
| | Terms | Occurrences | TF (%) | IDF | TF-IDF |
| 234a | Bonds | 40 | 2.67 | 1.10 | 2.925 |
| 234b | steroids | 19 | 1.27 | 1.40 | 1.771 |
| 234c | indictment | 10 | 0.67 | 1.60 | 1.068 |
| 234d | Giants | 4 | 0.27 | 1.22 | 0.326 |
| 234e | Barry | 4 | 0.27 | 1.10 | 0.294 |
| 234f | home run | 4 | 0.27 | 1.00 | 0.267 |
| 234g | baseball | 14 | 0.93 | 0.01 | 0.008 |
| 234h | Hank Aaron | 0 | 0.00 | 2.00 | 0.000 |
| 234i | Bobby | 0 | 0.00 | 1.40 | 0.000 |
| 234j | the | 70 | 4.67 | 0.00 | 0.000 |
| | ... | | | | |
| 234z | TOTAL | 1500 | | | |

*Figure 2A*

Example Document 4 (Canseco Testimony)

| | Terms | Occurrences | TF (%) | IDF | TF-IDF |
|---|---|---|---|---|---|
| 244a | steroids | 33 | 1.74 | 1.40 | 2.432 |
| 244b | Canseco | 28 | 1.47 | 1.65 | 2.431 |
| 244c | McGwire | 2 | 0.11 | 1.70 | 0.179 |
| 244d | Bonds | 2 | 0.11 | 1.10 | 0.116 |
| 244e | home run | 3 | 0.16 | 1.00 | 0.158 |
| 244f | baseball | 14 | 0.74 | 0.01 | 0.007 |
| 244g | Giants | 0 | 0.00 | 1.22 | 0.000 |
| 244h | Hank Aaron | 0 | 0.00 | 2.00 | 0.000 |
| 244i | indictment | 0 | 0.00 | 1.60 | 0.000 |
| 244j | the | 85 | 4.47 | 0.00 | 0.000 |
| | ... | | | | |
| 244z | TOTAL | 1900 | | | |

Example Document 5 (2008 SF Giants)

| | Terms | Occurrences | TF (%) | IDF | TF-IDF |
|---|---|---|---|---|---|
| 254a | Giants | 9 | 1.13 | 1.22 | 1.373 |
| 254b | Sabean | 4 | 0.50 | 1.55 | 0.775 |
| 254c | Lincecum | 5 | 0.63 | 1.20 | 0.750 |
| 254d | Zito | 3 | 0.38 | 1.20 | 0.450 |
| 254e | Barry | 3 | 0.38 | 1.10 | 0.413 |
| 254f | Bonds | 1 | 0.13 | 1.10 | 0.138 |
| 254g | home run | 1 | 0.13 | 1.00 | 0.125 |
| 254h | baseball | 2 | 0.25 | 0.01 | 0.003 |
| 254i | Bobby | 0 | 0.00 | 1.40 | 0.000 |
| 254j | steroids | 0 | 0.00 | 1.40 | 0.000 |
| | ... | | | | |
| 254z | TOTAL | 800 | | | |

*Figure 2B*

Example Document Relevance Identification

*265a* Query Terms: Bonds steroids

*267a* Example Minimum TF-IDF for Bonds:  0.000
*267b* Example Maximum TF-IDF for Bonds:  3.000
*267c* Example Minimum TF-IDF for steroids: 0.000
*267d* Example Maximum TF-IDF for steroids: 2.500

Normalized Document Relevance Numbers

|  | documents 262 / 261a | 262a Document 1 | 262b Document 2 | 262c Document 3 | 262d Document 4 | 262e Document 5 | ... |
|---|---|---|---|---|---|---|---|
| terms 264 | | | | | | | |
| 264a | Bonds | 0.85 | 0.69 | 0.98 | 0.04 | 0.05 | |
| 264b | steroids | 0.11 | 0.07 | 0.71 | 0.97 | 0.00 | |
| 264x | TOTAL | 0.48 | 0.38 | 0.84 | 0.51 | 0.02 | |

*Figure 2C*

Example Query Results

*260*

*266* Query Terms: Bonds steroids

*269*

| | Document Relevance | Document |
|---|---|---|
| *269a* | 84% (highly relevant) | Document 3 |
| *269b* | 51% (moderately relevant) | Document 4 |
| *269c* | 48% (moderately relevant) | Document 1 |
| *269d* | 38% (somewhat relevant) | Document 2 |

⋮

*268*

Expand query to further describe theme?

[ Yes ]    [ No ]

*Figure 2D*

Example Term Relevance Expansion

265a  Query Terms: Bonds steroids

Possible Additional Related Terms

|  | documents 272 | 272a | 272b | 272c | 272d | 272e |
|---|---|---|---|---|---|---|
| terms 274 | 270 | Document 1 | Document 2 | Document 3 | Document 4 | AVERAGE |
| 274a | home run | 1.333 | 1.125 | 0.267 | 0.158 | 0.721 |
| 274b | indictment | 0.000 | 0.000 | 1.068 | 0.000 | 0.267 |
| 274c | Hank Aaron | 0.667 | 0.375 | 0.000 | 0.000 | 0.261 |
| 274d | Giants | 0.407 | 0.305 | 0.326 | 0.000 | 0.260 |
| 274e | Barry | 0.367 | 0.276 | 0.294 | 0.000 | 0.234 |
| 274f | Canseco | 0.000 | 0.000 | 0.000 | 0.695 | 0.174 |

*Figure 2E*

Example Query Expansion

275

276  Query Terms: Bonds steroids

279

|  | Term Relevance (0-10) | Term |
|---|---|---|
| 279a | 8 | home run |
| 279b | 4 | indictment |
| 279c | 4 | Hank Aaron |
| 279d | 4 | Giants |
| 279e | 3 | Barry |
|  | ⋮ |  |

*Figure 2F*

Example Revised Document Relevance Identification

265b Query Terms: Bonds steroids "home run" "Hank Aaron"

Normalized Document Relevance Numbers

| | documents 262 | 262a | 262b | 262c | 262d | 262e | |
|---|---|---|---|---|---|---|---|
| terms 264 | 261b | Document 1 | Document 2 | Document 3 | Document 4 | Document 5 | ... |
| 264a | Bonds | 0.85 | 0.69 | 0.98 | 0.04 | 0.05 | |
| 264b | steroids | 0.11 | 0.07 | 0.71 | 0.97 | 0.00 | |
| 264c | home run | 0.95 | 0.80 | 0.19 | 0.11 | 0.09 | |
| 264d | Hank Aaron | 0.74 | 0.42 | 0.00 | 0.00 | 0.00 | |
| 264y | TOTAL | 0.66 | 0.49 | 0.47 | 0.28 | 0.03 | |

*Figure 2G*

Example Revised Document Relevance Identification

265c Query Terms: Bonds steroids indictment Canseco

Normalized Document Relevance Numbers

| | documents 262 | 262a | 262b | 262c | 262d | 262e | |
|---|---|---|---|---|---|---|---|
| terms 264 | 261c | Document 1 | Document 2 | Document 3 | Document 4 | Document 5 | ... |
| 264a | Bonds | 0.85 | 0.69 | 0.98 | 0.04 | 0.05 | |
| 264b | steroids | 0.11 | 0.07 | 0.71 | 0.97 | 0.00 | |
| 264g | indictment | 0 | 0 | 0.76 | 0 | 0 | |
| 264h | Canseco | 0 | 0 | 0 | 0.97 | 0 | |
| 264z | TOTAL | 0.24 | 0.19 | 0.61 | 0.50 | 0.01 | |

DETERMINING RELEVANT INFORMATION FOR DOMAINS OF INTEREST

CROSS-REFERENCE TO RELATED APPLICATIONS

This application claims the benefit of provisional U.S. Patent Application No. 61/122,282, filed Dec. 12, 2008 and entitled "Determining Relevant Information For Domains Of Interest," and of provisional U.S. Patent Application No. 61/067,162, filed Feb. 25, 2008 and entitled "Platforms, Systems and Methods for Data Handling," each of which is hereby incorporated by reference in its entirety.

TECHNICAL FIELD

The following disclosure relates generally to determining relevant information related to domains of interest, such as information about relevant themes within a domain and/or about documents whose contents are relevant to such themes.

BACKGROUND

An abundance of information is available to users on a wide variety of topics from a variety of sources. For example, portions of the World Wide Web ("the Web") are akin to an electronic library of documents and other data resources distributed over the Internet, with billions of documents available. In addition, various other information is available via other communication mediums.

With the abundance of available information, locating documents and other information that match particular interests of a user can be difficult. One option for attempting to locate documents involves performing searches using various Web-based search engines. A typical Web search involves a user providing a search query that includes one or more search terms to a search engine, with the search query in some situations also including one or more logical search operators (e.g., "AND", "OR", "NOT", an indication that a particular search term is required, etc.) that are each related to one or more of the search terms. After receiving such a search query, the search engine typically identifies at least some available documents whose contents match the search query (e.g., the contents include each of the required search terms), generates one or more Web pages that include links to one or more of the identified documents, and provides one or more of the generated Web pages to the user as search results for the search query. In addition, different users entering the same search string typically receive the same search results.

Various techniques are used by search engines to identify documents whose contents match particular search terms. For example, some search engines do automated pre-processing prior to receiving search requests in order to create an index that maps terms to Web pages whose contents include those terms. Such pre-processing typically uses an automated program called a "Web spider" that crawls the Web to identify documents to index, such as by traversing links from known Web pages to new Web pages. In addition, some search engines use manual categorization of documents to track which Web pages are related to specified categories and/or terms, such as via a hierarchical directory of categories and sub-categories. Thus, search results from a search engine may be based in some cases on information from an automatically pre-generated index and/or from a manually pre-generated category directory.

However, existing search engines and other techniques for identifying information of interest suffer from various problems.

BRIEF DESCRIPTION OF THE DRAWINGS

FIGS. 1A and 1B illustrate examples of techniques for determining relevance information related to domains of interest.

FIGS. 2A-2L illustrate examples of techniques for determining relevance information related to an example domain of interest.

DETAILED DESCRIPTION

Figure 1B:
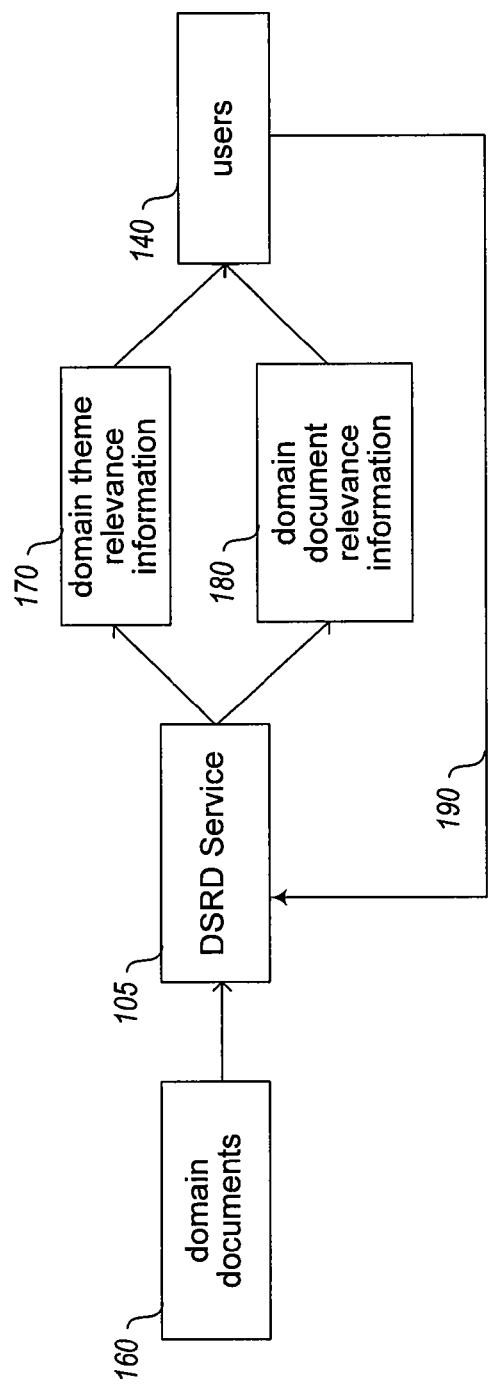

Techniques are described for determining and using relevant information related to topics and subject areas of interest, also referred to as domains of interest herein. In at least some embodiments, the techniques include automatically analyzing documents and other content items related to one or more related domains of interest in order to automatically determine information about relevant themes within the domain and/or about which content items have contents that are relevant to such themes. Such automatically determined relevance information for the domain(s) may then be used in various ways, including to assist users in specifying themes of interest and/or in obtaining content items with contents that are relevant to specified themes. In addition, in at least some embodiments, information about how information is used by users and other entities may be tracked and used as feedback for learning improved determinations of relevant themes and/or relevant content items within the domain(s), such as by using automated machine learning techniques. Furthermore, in at least some situations, the techniques may be used in conjunction with an embodiment of a computer-implemented Domain-Specific Relevance Determination ("DSRD") service that automatically determines relevance information related to domains of interest and provides such information for use by others, as described in greater detail below.

As previously noted, in at least some embodiments, the described techniques include automatically analyzing documents and other content items related to a domain of interest in order to automatically determine information about relevant themes within the domain and/or about which content items have contents that are relevant to such themes, such as by generating an index that relates particular content items to particular terms and/or themes. While various of the following discussion refers to content items as being "documents," it will be appreciated that the described techniques may be used with a wide variety of types of content items, including, for example, textual documents (e.g., Web pages, word processing documents, slide shows and other presentations, emails and other electronic messages, etc.), images, video files, audio files, software code, firmware and other logic, genetic codes that each accompany one or more sequences of genetic information, other biological data, etc. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; mathematical equations and mathematical data structures, other types of alphanumeric data structures and/or symbolic data structures; encrypted data, etc.). In at least some embodiments, a group of multiple documents that are specific to a domain are selected and automatically analyzed by an embodiment of the DSRD service. The group of documents may be, for example, a corpus that includes all available documents for a particular domain or that includes sufficient documents to be representative of the domain. In addition, the documents to be analyzed may be obtained from one or more sources, such as from a Web site that includes comprehensive information specific to one or more domains (e.g., a hypothetical "all-baseball-now.com" Web site that includes comprehensive information about baseball, the "espn.com" Web site that includes varied information about a variety of sports, the Wikipedia encyclopedia Web site at "wikipedia.org" and Wikipedia Commons media collection Web site at "commons.wikipedia.org" and Wikinews news source Web site at "wikinews.org" that include varied information about a large number of domains, etc.). In some embodiments, each of the documents has contents that are at least partially textual information that are analyzed, while in other embodiments at least some documents or other content items may include other types of content (e.g., images, video information, audio information, etc.).

The automated analysis of documents for a domain may in at least some embodiments include analyzing the contents of the documents in order to determine themes that are relevant to the domain, such as by using data mining techniques or other techniques. For example, if the documents being analyzed are related to the baseball domain, the themes that may be determined include themes specific to particular players, to particular teams, to particular leagues (e.g., Major League Baseball, Division I college baseball, etc.), to particular events (e.g., a particular year's All-Star game or World Series, the steroid use controversy, etc.), to particular seasons, to particular records (e.g., the cumulative home run record), etc. In at least some embodiments, the automated analysis includes indexing the documents to determine what terms are present in each of the documents, and then analyzing the importance of some or all such terms to the documents. For example, in at least some embodiments, an initial determination of a degree of relevance of each term in a document to the document is made based on the distinctiveness of the term to the contents of the document, such as by using a term frequency-inverse document frequency ("TF-IDF") analysis. In addition, combinations of one or more related terms used throughout the group of documents may be selected to represent themes of the domain, such as for the most relevant terms, and the determined degree of relevance of the one or more related terms for a theme to one or more documents may be used to determine a degree of relevance of the one or more documents to the theme, as discussed in greater detail below. Furthermore, as discussed in greater detail elsewhere, the terms or other information that are associated with a document or other content item and that are analyzed to determine relevant themes may in some embodiments include other types of information, including information that is not included in the contents of the content item, such as metadata associated with the content item and/or information associated with one or more users to whom the content item corresponds.

As noted above, the generation of document term analysis information may be performed in various manners in various embodiments, and in some embodiments uses a TF-IDF analysis. Such a TF-IDF analysis uses a vector space representation of the documents to be analyzed, in which each document is treated as being similar to a "bag of words," without considering the role of the terms in the document (e.g., without considering grammar, sentence structure, paragraph structure, punctuation, etc.). In such situations, the document representation may largely or solely reflect the Term Frequency ("TF") of the terms in the documents, which enables an efficient mapping of documents into a mathematically straightforward high-dimensional vector space. In addition, the distinctiveness of a particular term relative to the various documents for a domain may be considered and used when determining the relevance of terms to documents, such as by considering how ubiquitous a particular term is in the documents of a corpus or other group of documents. In particular, the Term Frequency of a term i in a document d and the Inverse Document Frequency ("IDF") of the term i across the documents of a domain may be expressed as follows in at least some embodiments:

$$TF(i, d) = \frac{\text{\# occurrence } s \text{ of term } i \text{ in document } d}{\text{\# terms in document } d},$$

$$IDF(i) = -\log\left(\frac{\text{\# documents containing term } i}{\text{\# documents}}\right)$$

The Term Frequency-Inverse Document Frequency ("TF-IDF" or "TF.IDF") score for a term and a document may then be determined by multiplying the TF score for the term and document and the IDF score for the term. Such a TF-IDF(i,d) score (also shown as "TF-IDF$_{i,d}$" or "TF.IDF$_{i,d}$") for a particular term i and a particular document d may be used as a measurement of how important that term in the vector space representation is in describing the fingerprint of that document in the corpus, such as to reflect a degree of relevance of that term to that document. It is a metric that ranks highly words that occur frequently in a specific document, but infrequently in the corpus as a whole. Additional details are included below related to analyzing the documents of a domain in order to determine themes that are relevant to the domain or across multiple domains.

The automated analysis of the documents for a domain may in at least some embodiments also include analyzing the contents of the documents in order to determine which documents have contents that are relevant to determined themes for the domain. For example, in at least some embodiments, an initial determination of the relevance of the documents may be performed so as to determine a degree of relevance of each document to each of some or all themes, such as based on the relevance of particular terms within a theme to the content of a particular document, as discussed in greater detail below. In addition, in some embodiments the documents that are analyzed as part of the document relevance determination are the same documents that are analyzed to determine relevant themes, while in other embodiments some or all of the document relevance determination documents are distinct from the theme relevance determination documents (e.g., if the document relevance determination documents include new documents that were not available during a prior theme relevance determination; if the theme relevance determination documents are a specialized subset of documents that are selected for training purposes, such as due to being representative of a domain; etc.). Furthermore, in at least some embodiments and situations, groups of multiple related documents may be analyzed together with respect to some or all themes, such as by treating the multiple related documents as a single document for the purpose of the analysis, while in other situations a particular document may be divided into multiple parts that are each treated as a distinct document with respect to some or all themes for the purpose of the analysis. Additional details are included below related to analyzing documents of a domain in order to determine documents that are relevant to determined themes.

After relevance information is automatically determined by the DSRD service regarding relevant themes within or across one or more domains and/or about particular documents that have contents that are relevant to such themes, such automatically determined relevance information may then be used in various ways in various embodiments, including to assist human users and other entities in specifying themes of interest and/or in obtaining documents with contents that are relevant to specified themes. For example, as described in greater detail below, automatically determined relevance information regarding relevant themes within or across one or more domains may be used by the DSRD service or other affiliated service to assist a human user or other entity (e.g., an automated program) external to the DSRD service in specifying one or more themes of interest, such as for use as part of a search query, to identify preferences of the user, etc. The automatically determined theme information may be used in various manners in various embodiments, such as receiving one or more terms from a user and presenting related information to the user (e.g., themes that include the received terms, other terms that are related to the received terms, etc.), presenting a list of automatically determined themes to a user for browsing or selection, etc. Similarly, as described in greater detail below, automatically determined relevance information regarding relevant documents within a domain may be used by the DSRD service or other affiliated service to assist a human user or other entity (e.g., an automated program) external to the DSRD service in obtaining content related to one or more themes of interest, such as in response to a search query, to push or otherwise provide relevant information to a user that is not explicitly requested (e.g., based on previously specified theme preferences), etc. Furthermore, information about the inter-relatedness of various terms and/or themes may be displayed to users in various manners in various embodiments. Additional details related to examples of possible use of determined relevant information related to domains of interest are available in U.S. patent application Ser. No. 12/334,389, filed Dec. 12, 2008 and entitled "Electronic Profile Development, Storage, Use, and Systems Therefor," and in U.S. patent application Ser. No. 12/334,416, filed Dec. 12, 2008 and entitled "Advertising Selection and Display Based on Electronic Profile Information," each of which is hereby incorporated by reference in its entirety.

In addition, in at least some embodiments, information about how automatically determined theme and/or document relevance information is used by users or other entities is tracked and used in various ways. For example, in at least some embodiments, the information about the use of the automatically determined theme and/or document information may be used by the DSRD service as feedback related to the automatically determined theme and/or document relevance information. Such feedback may be used, for example, to revise the initial determination of the relevance of particular terms and term combinations that may be used as determined themes and/or to revise the initial determination of the relevance of particular documents to the determined themes, and this revised determined relevance information may then be used by the DSRD service or other affiliated service in a manner similar to that as the initially determined relevance information. In this manner, a continuous or other repeated feedback loop may be used to repeatedly improve the automatic relevance determinations performed by the DSRD service. As described in greater detail below, in some embodiments the feedback is used to learn or revise automatically determined theme and/or document information, such as by use of a configured neural network or other adaptive model or system. Furthermore, in at least some embodiments and situations, the configured neural network or other adaptive system may be automatically extended in various ways to use information about new documents that become available and/or new themes that are determined.

For illustrative purposes, some examples and embodiments are described below in which specific types of information are analyzed in specific manners, and in which determined information related to a particular domain is used in specific manners. These examples are provided for illustrative purposes and are simplified for the sake of brevity, and it will be appreciated that the inventive techniques may be used in a wide variety of other situations, some of which are described in greater detail below. For example, while the analysis of particular textual documents is described below, information in other forms may be similarly analyzed and used. In addition, while particular algorithms and technologies are illustrated as being used to determine relevant themes within or across one or more domains, to determine particular documents that are relevant to a theme, and to learning improved relevance of themes and/or documents based on use and other feedback, other algorithms and technologies may be used in other manners.

FIGS. 1A and 1B illustrate examples of an automated domain-specific relevance determination service that uses the described techniques to determine relevance information related to domains of interest and to provide related information and functionality to users or other entities. In particular, FIG. 1B illustrates an embodiment of a DSRD service 105, along with a high-level description of example data flow to and from the DSRD service 105 as part of determining and using relevant domain-specific information. In this example, the DSRD service 105 accesses and analyzes various documents 160 related to one or more domains of interest in order to determine relevance information related to each of the domains. The determined relevance information that is generated by the DSRD service 105 in this example includes information 170 about relevant themes within each of one or more domains, and information 180 about which documents have contents that are relevant to such themes, although in other embodiments only one of the types of relevance information may be determined. In this example, the DSRD service 105 provides at least some of the determined relevant theme information 170 and/or at least some of the determined relevant document information 180 to various users 140 for their use. While not illustrated here, in other embodiments the DSRD service 105 may instead provide the determined relevant theme information 170 and/or the determined relevant document information 180 to the users 140 in one or more other manners, such as via one or more intermediate other services (e.g., other services that obtain the relevant domain-specific information from the DSRD service 105 and use it in various ways). Furthermore, in this example, the DSRD service 105 may obtain various feedback or other information 190 related to the use by the users 140 of the determined relevant domain-specific information 170 and/or 180, and may use that feedback to refine the determined relevant domain-specific information 170 and/or 180. Additional details related to the various data flow and actions of the DSRD service 105 are described in greater detail elsewhere, including with respect to example embodiments discussed in FIGS. 2A-2L.

FIG. 1A illustrates additional example details regarding one embodiment of the DSRD service 105 of FIG. 1B. In particular, in the example of FIG. 1A, the documents that are accessed and analyzed by the example DSRD service 105 documents may include domain documents 160 that are accessible over a network 100 (e.g., publicly accessible from one or more Web sites or other information sources) and/or optional domain documents 135 to which the DSRD service 105 has specialized access (e.g., domain documents that are generated by or otherwise provided by the service 105; domain documents that are available from a third-party source but that are not publicly accessible, such as if available for paid access or based on a defined relationship between the service 105 and the third-party source; etc.). Furthermore, after determining the relevance information for one or more domains, the DSRD service 105 further interacts over the network 100 with the various users 140 and/or with one or more optional other services 150 (e.g., other affiliated services that interact with users 140 and that use information provided by the DSRD service 105).

In addition, in this example, the DSRD service 105 includes several modules that each provides some of the functionality of the DSRD service 105, including a Domain Analysis Manager module 110, a Relevant Document Determination Manager module 120, and a Relevant Theme Determination Manager module 130. In particular, the Domain Analysis Manager module 110 performs various actions to obtain and automatically analyze the contents of the domain-related documents, such as to make such analyzed information available for use by the modules 120 and 130. The Relevant Document Determination Manager module 120 uses the analyzed document information to determine documents that are relevant to particular terms or other themes, such as to generate the domain document relevance information 180 of FIG. 1B (not shown in FIG. 1A, but which may be stored on one or more storage devices, also not shown in FIG. 1A). Similarly, the Relevant Theme Determination Manager module 130 uses the analyzed document information to determine themes that are relevant to the domain, such as to generate the domain theme relevance information 170 of FIG. 1B (not shown in FIG. 1A, but which may be stored on one or more storage devices, also not shown in FIG. 1A). In this illustrated embodiment, the modules 120 and/or 130 may then provide the generated domain-specific relevance information to the users 140 or optional other services 150, such as via provided GUIs ("graphical user interfaces") that users may interactively use and/or via provided APIs ("application programming interfaces") via which software programs may programmatically interact. In other embodiments, one or more other modules (not shown) of the DSRD service 105 may instead interact with the users 140 and/or optional other services 150 via one or more GUIs and/or one or more APIs that are provided by the DSRD service 105.

While not illustrated in FIGS. 1A and 1B, the DSRD service 105 may be implemented in various manners, including with one or more software modules executing on one or more computing systems (not shown), and may store various information on one or more local or remote storage devices (not shown). Similarly, the users 140, other services 150, and domain documents 160 may use computing devices or systems (not shown) to perform the various described interactions and/or to store the various described information. In addition, while the DSRD service 105 and other services 150 may be provided by unaffiliated entities in some embodiments, in other embodiments the DSRD service 105 and one or more of the other services 150 may instead be provided by a single operator (e.g., in conjunction with each other). Furthermore, the network 100 illustrated in FIG. 1A may have various forms, such as, for example, a publicly accessible network of linked networks (e.g., the Internet), possibly operated by various distinct parties. In other embodiments, the network 100 may be a private network, such as, for example, a corporate or university network that is wholly or partially inaccessible to non-privileged users. In still other embodiments, the network 100 may include one or more private networks with access to and/or from the Internet, and some or all of the network 100 may further include broadband or broadcast wired or wireless links (e.g., a cellular telephone connection; a wireless computer connection that uses Wi-Fi, Wi-MAX, Bluetooth, broadcast analog or digital television, EVDO, satellite or other wireless networking or communication protocol; etc.) in at least some embodiments.

In addition, the various users 140 and other entities may interact with the DSRD service 105 in various manners to make requests and to specify various information. For example, users may register or subscribe with the DSRD service 105 and/or an optional other service 150, such as to supply various preferences and other information that may be used in later requests. In such embodiments, after a user interacts with the DSRD service 105 to register, the user may be issued one or more identifiers (e.g., keys, tokens, user names, etc.) that are associated with the user and later used when other requests are made, such as requests for search results for specified queries. In addition, in some embodiments, an optional other service 150 may register or otherwise interact with the DSRD service 105 to establish an affiliated relationship, such as to allow the other service 150 to obtain access to at least some domain-specific relevance information generated by the DSRD service 105. Furthermore, various fees may be associated with the use of a DSRD service, such that the DSRD service may respond to at least some requests in exchange for fees paid by the requester, such as to provide domain-specific relevance information to an optional other service 150 in exchange for fees from the other service 150, or to provide domain-specific relevance information to a user 140 in exchange for fees from the user. In other embodiments, the DSRD service 105 may obtain fees in other manners, such as from the providers of domain-specific documents and other content to perform a relevance determination related to that content, from other third-parties such as advertisers and retailers (e.g., for providing advertisements or other indicated content to at least some users 140), etc.

FIGS. 2A-2L illustrate examples of techniques for determining relevance information related to an example domain of interest, such as that may be automatically performed by an embodiment of the DSRD service.

For example, FIGS. 2A and 2B illustrate examples of summary information about several documents that are part of a particular example domain of interest, along with example term analysis information that may be generated by an embodiment of the DSRD service for the documents related to the domain. In particular, as indicated with respect to example summary information 200, the example domain of interest relates to baseball, and the corpus of domain-specific documents that are available in this example for the domain includes 1000 documents (e.g., news articles, player biographies, team summaries, etc.).

The information 200 in this example includes a summary of a few example terms that are present in the corpus, along with IDF information for those terms. In particular, several terms 202a are shown, with each having a unique term ID 202b, an indication of a number of documents 202c in the corpus that include that term, and a corresponding IDF value 202d for the term and the corpus documents. Various other summary information may also be generated and stored, but is not shown in this example. In addition, each row 204 in the example table 200 reflects a distinct term, such as for row 204a that corresponds to the common term "the", which is present in every one of the 1000 documents in the corpus, and thus has an IDF value of zero. In this example, the rows 204 are sorted based on IDF value, such that subsequent terms have increasing IDF values, reflecting their presence in less of the documents of the corpus than preceding terms, and thus being more distinctive with respect to those documents in which they are present. Additional details regarding calculating IDF values are included elsewhere. In addition, in some embodiments, some common terms or other indicated terms (e.g., the term "the") may be removed as part of the document term analysis, and thus may not be shown in such summary information 200 or used in the later determination of relevance-related information. Furthermore, some of the terms 202a in this example are phrases that include multiple related words, such as "home run" and "Hank Aaron," while other terms that may be used together at times (e.g., "Barry Bonds" and "Bobby Bonds") are shown as separate terms. It will be appreciated that such multi-words terms may be determined in various manners, such as automatically based on their repeated use together and lack of use separately, automatically based on the inclusion of such terms in a dictionary of common terms for the domain or other similar information, at least partially in a manual manner based on input from an operator of the DSRD service, etc. In other embodiments, each word may be treated as a separate term, at least initially, and may optionally be later grouped together as part of a common theme based on a learned relevance of the inter-relatedness of those terms from the terms being repeatedly used together by users, as discussed in greater detail elsewhere.

The other example tables 210, 220, 230, 240 and 250 that are illustrated in FIGS. 2A and 2B each reflect an example document in the corpus, and include various information about example terms in those documents and corresponding term relevance information for those terms and those documents. In particular, information 210 corresponds to an example document 1, which in this example is a news article related to Barry Bonds setting the career home run ("HR") record in 2007 while playing for the San Francisco Giants, surpassing the previous record held by Hank Aaron. While Bonds was pursuing the home run record, there was also significant ongoing news coverage related to a steroid controversy among players in Major League Baseball, and Bonds was later indicted on charges related to alleged use of steroids.

The various entries 214 in the table 210 each correspond to an example subset of terms 212a that are present in the 1500-word document 1, such as the term "Bonds" in entry 214a, the term "Hank Aaron" in entry 214c, etc. The number of occurrences 212b of each term in document 1 is also illustrated, and a corresponding term frequency value 212c is shown. IDF values 212d are also replicated here for the terms, and correspond to the same values 202d in information 200. Furthermore, each entry 214 includes a TF-IDF value 212e based on the term frequency value 212c and IDF value 212d. For example, the term "Bonds" in entry 214a is indicated to occur 35 times in document 1, which results in a 2.33% frequency among the 1500 words of the document. The IDF value 212d for the term "Bonds" is 1.10, as corresponds to information 202d of entry 204d of information 200, and the TF-IDF value 212e for Bonds in entry 214a in this example is 2.559. The entries 214 are illustrated in this example in order of decreasing value of TF-IDF values, indicating that the term "Bonds" is the most descriptive term for this document that is illustrated, while other terms such as "the" and "indictment" in entries 214i and 214j, respectively, are not descriptive of this document (e.g., due to the term "the" being present in all the documents of the corpus and thus having a zero IDF value, and due to the term "indictment" not occurring in this example document and thus having a zero term frequency value 212c). Additional details regarding calculating TF and TF-IDF values are included elsewhere.

Tables 220, 230, 240, and 250 include similar information for example documents 2, 3, 4, and 5, respectively. In particular, example document 2 is an overview biography of Barry Bonds, focusing on Bonds' various accomplishments and including corresponding terms 222a as shown in various entries 224. Example document 3 is a news article corresponding to Bonds' indictment on possible steroid-related abuses, and includes corresponding terms 232a as shown in various entries 234. The example document 4 corresponds to an event that occurred prior to Bonds' indictment and initiated some of the steroids-related controversy in Major League Baseball, and in particular corresponds to former Major League Baseball player Jose Canseco testifying before Congress related to alleged steroid use in Major League Baseball, with corresponding terms 242a shown in various entries 244. Example document 5 is a news article from the middle of the 2008, Major League Baseball season and focuses on the current status of the San Francisco Giants team, for which Bonds stopped playing after the 2007 season, with corresponding terms 252a shown in various entries 254. As discussed in greater detail with respect to FIGS. 2C-2L, the example term information for these example documents will be used to illustrate some of the described techniques in terms of determining relevant themes and relevant documents for particular themes for this example baseball-related domain.

FIGS. 2C and 2D illustrate an example of a search query specified by a user, in which the example term analysis information illustrated in FIGS. 2A and 2B for the example documents 1-5 of the corpus may be used by the DSRD service to determine particular information that is relevant to the query. In particular, FIG. 2C illustrates a query that has been specified by a user, which in this example includes the query terms 265a "Bonds" and "steroids". Various information 261a is shown that indicates an assessed degree of relevance of each of the two query terms to each of the example documents 1-5, including a generated normalized aggregated document relevance score or number 264x, for each of the example documents 262. As described in greater detail below, a normalized document relevance number may be generated for each term 264 and each document 262, with the normalized scores for each term for a document being averaged in this example to generate a document relevance number 264x for the document based on the combination of the two query terms. In particular, in this example, the relevance of a term to a document is based in part on the TF-IDF value for that term and document, and is normalized in part using maximum and minimum TF-IDF values for that term across all the documents in the corpus. Example minimum and maximum TF-IDF values for the two query terms are shown in information 267a-267d in this example, although such information 267 and/or the table 261a may not be illustrated to the user that specified the query in at least some embodiments. Additional details related to the generation of example document relevance numbers are included below.

In this example, example document 3 has the highest generated document relevance value for the query terms, as the contents of document 3 related to Bonds' steroid-related indictment are highly relevant to both query terms 265a. Example documents 1 and 4 are each moderately relevant to the combination of query terms 265a, based on each of those example documents being highly relevant to one of the query terms and only slightly relevant to the other query term (i.e., with example document 1 being highly relevant to the "Bonds" term and only slightly relevant to the "steroids" term, and with example document 4 being highly relevant to the "steroids" term and only slightly relevant to the "Bonds" term), as shown in column 262a for document 1 and column 262d for document 4, in entries 264a and 264b of information 261a. The other example documents 2 and 5 are less relevant to the query terms 265a than the other three example documents.

As previously noted, the determination of the relevance of a particular document to one or more specified terms (e.g., terms that are part of a search query), such as multiple related terms that are part of a theme, may be performed in various manners in various embodiments. As one specific example, the TF-IDF scores for each of the specified terms and document may be combined in various manners, such as to generate an average or sum. In particular, in at least some embodiments, an average of the TF-IDF scores for the various specified terms is generated, and may further be normalized (e.g., to represent a relevance percentage or other number between 0 and 1), so as to produce a normalized document relevance ("DR") score for the specified terms that facilitates comparison between documents and that facilitates human understanding of the DR scores. The DR score for a document d relative to a group g of one or more specified terms i may be determined as follows in at least some embodiments:

$$DR(d, g) = \frac{1}{NTerms(g)} \sum_{i}^{g} \frac{TF \cdot IDF_{i,d} - \min(TF \cdot IDF_i)}{(\max(TF \cdot IDF_i) - \min(TF \cdot IDF_i))}$$

with the summation performed for each of the terms i in g, with NTerms(g) reflecting the quantity of terms i in group g, and with the minimum and maximum TF-IDF$_i$ scores for a particular term i reflecting the lowest and highest scores, respectively, for that term across all the documents k for a domain.

FIG. 2D illustrates an example of information 260 that may be displayed to or otherwise provided to the user in response to the query terms 265a "Bonds" and "steroids" indicated in FIG. 2C. The information 260 may, for example, be part of a Web page that is generated and provided to a client device of the user for display, or may otherwise be part of an information screen that is presented to the user.

In particular, in this example, the information 260 includes a visual indication 266 of the specified query terms 265a, and a list 269 of corresponding search results are shown in order of generated document relevance. Furthermore, in this example, each of the entries in the list 269 includes an indication not only of the corresponding relevant document (e.g., a name or other identifier of the document, such as may be displayed as a user-selectable link that may be selected by the user to access the document), but also an indication of the corresponding generated normalized document relevance number for the document, such as to provide information to the user in assessing whether to obtain further information about a particular document or otherwise select the document as being relevant to the query terms 265a. The indicated normalized document relevance numbers in this example each also include a textual assessment of the degree of relevance of the normalized document relevance number, although in other embodiments only one (or neither) of the normalized document relevance numbers and associated textual assessments may be shown. In addition, the selection and display of particular search results may be performed in various manners in various embodiments, including to show a specified quantity of query results, to show some or all query results that are above a specified minimum document relevance value, etc.

In addition, in this example, additional information and user-selectable controls 268 are provided for possible selection by the user, although in other embodiments such additional information may not be shown. In this example, the additional information 268 asks the user if he/she would like to expand the previously specified search query to further describe a relevant theme for the domain, such as to improve the accuracy of the search results by specifying a more specific or otherwise different theme that better represents the user's interests than the query terms 265a. As one possible example, as previously discussed with respect to example documents 1 and 4 that are each highly relevant to one of the specified query terms but only mildly relevant to the other specified query term, the user may be able to improve the accuracy of the search results by clarifying whether the user is primarily interested in the steroids-related controversy in Major League Baseball (e.g., as it pertains to not only Bonds but also to other players), or instead is primarily interested in information related to Bonds that is only tangentially related to Bonds' alleged use of steroids (e.g., the career home run record set by Bonds). More generally, by identifying additional terms that are particularly relevant to the user's one or more themes of current interest, the resulting expanded query terms may better disambiguate the various possible themes that may be associated with the terms in the initial query.

The selection of the user-selectable "Yes" control in information 268 of FIG. 2D may prompt various additional actions by the DSRD service, with one such example described in greater detail with respect to FIGS. 2E and 2F. In particular, FIG. 2E illustrates information 270 about other terms 274 that may be related to the specified query terms 265a "Bonds" and "steroids", with indications of the assessed degrees of relevance of the other terms to the specified query terms 265a that are determined. In other embodiments, the use of the theme-related term relevance information may be prompted in other manners, such as if it is performed automatically for some or all users in some or all situations (e.g., so as to display additional information with information 260 of FIG. 2D regarding the possible relevance of one or more other terms, whether instead of or in addition to the information 268).

The various information 270 in FIG. 2E may be used in various ways, such as part of further defining a particular theme for use in a refined search query that is based in part on the initially specified query terms 265a. For example, in some embodiments some or all of such information 270 may be illustrated to the user that specified the query terms 265a, although in the illustrated embodiment the information 270 is not displayed to the user. In this example, the information 270 includes a number of term entries 274a-274f that each correspond to a candidate additional term for possible combination with the query terms 265a, and document columns 272a-272d indicate an assessed degree of relevance of those terms to example documents 1-4. Column 272e indicates an aggregate term relevance score for the candidate term in each entry 274 with respect to the query terms 265a, such as to reflect an assessed degree of relevance of the candidate term to the possible theme represented by the query terms 265a. The various example documents 272 and candidate additional terms 274 may be selected in various manners in various embodiments. For example, the candidate additional terms may be selected by first selecting a subset of the documents of the corpus that are determined to be most relevant to the query terms 265a, such as based on the normalized document relevance numbers 264x illustrated in FIG. 2C. The most relevant documents may be selected in various manners, such as to select a specified quantity of the documents with the highest document relevance numbers, to select a specified percentage of the documents with the highest document relevance numbers, to select some or all of the documents whose document relevance numbers are above a specified threshold (e.g., a predefined threshold, such as a minimum document relevance number threshold; or a dynamically determined threshold, such as if grouping documents with similar document relevance number values provides a naturally occurring threshold point between a group of the most relevant documents and other documents), etc. In this example of FIG. 2E, example document 5 has not been selected as a most relevant document for further use in this example based on its low document relevance number of 2%, as indicated in column 262e for entry 264x in FIG. 2C, but the other example documents 1-4 have been selected for use as relevant documents.

In this example, once the most relevant documents are selected for the query terms 265a, candidate additional terms are selected for the query terms 265a based at least in part on those selected documents. For example, the candidate additional terms may be selected based on terms in the selected documents other than the query terms 265a that are most relevant for those selected documents, such as based on TF-IDF values of those other terms for the selected documents and/or based on term frequency values for those other terms for the selected documents. In this example, the numbers illustrated in the information 270 for each term entry 274 and example document 272 reflects the TF-IDF value for that term and document. For example, with respect to entry 274a corresponding to term "home run", the term relevance value 272a of that term for example document 1 is indicated to be the TF-IDF value 1.333 (as previously indicated in entry 214b and column 212e of information 210 of FIG. 2A), and the term relevance value 272b for term "home run" in entry 274a for example document 2 is indicated to be the TF-IDF value of 1.125 (as previously indicated in row 224b and column 222e of information 220 of FIG. 2A).

Furthermore, in this example, the term relevance values for each of the terms 274 is then aggregated across the selected documents, such as by averaging those individual TF-IDF document-specific values, with the resulting determined aggregate term relevance score or number for each candidate additional term 274 being reflected in column 272e. In this example, the candidate terms 274 are shown in decreasing order of their determined aggregate relevance values for the query terms 265a, such that the candidate term "home run" in entry 274a is determined to be the most relevant candidate additional term for the specified query terms, and such that the candidate additional term "Canseco" in entry 274f is determined to be the least relevant candidate additional term for the specified query terms that are shown. The particular candidate additional terms that are selected for consideration based on the group of selected documents may be identified in various ways, such as by using a specified quantity of other terms from each document or from all documents that are determined to be most potentially relevant (e.g., by using TF-IDF values, term frequency values, or other individual document term relevance values), by using a specified percentage of the most potentially relevant other terms from each document or from all documents, by using some or all of the other terms whose TF-IDF values (or other individual document term relevance values) are above a specified threshold for at least one of the selected documents or for all of the selected documents or for some specified minimum subset of the most relevant documents (e.g., a predefined threshold, such as a minimum term relevance number threshold; or a dynamically determined threshold, such as if grouping terms with similar term relevance number values provides a naturally occurring threshold between a group of the most relevant terms and other terms), etc. In other embodiments, the candidate additional terms and/or relevant documents may be selected in other manners, and the individual term relevance values and/or aggregate term relevance values may be determined in other manners. Additional details related to the generation of example term relevance scores or other values are included elsewhere.

FIG. 2F continues the example of FIGS. 2A-2E, and illustrates an example of information 275 that may be displayed or otherwise provided to the user to include information about possible other terms for selection and use with the previously indicated query terms 265a, which were shown with the visual indication 266 in FIG. 2D and are shown with the visual indication 276 in FIG. 2F. As previously noted, the provision of the information 275 may be prompted in various manners, such as in response to selection of the "Yes" user-selectable control in information 268 of the information 260 in FIG. 2D, or instead in other manners. In addition, in a manner similar to that of information 260 of FIG. 2D, the illustrated information 275 may be provided to the user in various manners, such as, for example, as part of a Web page that is generated and provided to a client device of the user for display, or otherwise as part of an information screen that is presented to the user (e.g., as part of the GUI of a software application executing on a computing device of the user, such as a software application provided by an operator of the DSRD service for use with the DSRD service, or instead provided by a third party).

The information screen 275 in this example includes a list 279 of possible other related terms for the specified query terms 265a, such as is generated in this example based on at least some of the candidate additional terms 274 of FIG. 2E. In particular, the example related other terms 279 include several entries 279a-279e, and are shown in order of decreasing determined term relevance based on the aggregate relevance scores 272e of FIG. 2E. In addition, in this example, an indication of the term relevance of each of the included possible other terms is shown, although in other embodiments such term relevance information may not be included or may be shown in other manners—in this example, the determined term relevance scores from column 272e of FIG. 2e have been translated into a scale from 0 to 10, with possible other terms that are determined to be most relevant having a possible value of 10, and with the possible other terms that are determined to be less relevant having lower values. While not illustrated here, each of the possible other terms may be a user-selectable link or otherwise have one or more associated user-selectable controls to allow the user to select or otherwise specify that term as being of interest, such as to specify to include that selected term as part of a revised query. In other embodiments, the term relevance information may be displayed in other manners, such as to indicate the actual determined term relevance scores 272e from FIG. 2E, to display a normalized version of such term relevance scores (in a manner similar to that previously described with respect to FIG. 2D for document relevance scores), etc. In addition, while textual descriptions of the term relevance values are not shown in FIG. 2F in a manner similar to those of FIG. 2D, in other embodiments such term relevance values may be shown.

FIGS. 2G and 2H continue the examples of FIG. 2A-2F, and in particular correspond to two alternative themes that the user may specify, such as by selecting additional related terms as indicated in FIG. 2F, or instead in another manner. In particular, FIG. 2G corresponds to an example in which the user has selected additional other terms "home run" and "Hank Aaron" to use along with prior terms "Bonds" and "steroids" as part of a group of expanded query terms 265b, such as based on selection of entries 279a and 279c of the list 279 in FIG. 2F. FIG. 2G also includes additional information 261b that indicates the relevance of the various example documents 1-5 to the expanded query terms 265b, in a similar manner to that previously discussed with respect to information 261a of FIG. 2C. The various information 261b in FIG. 2G may be used in various ways, such as to determine new search results that include the documents of the corpus that are most relevant to the expanded query terms 265b, which may be displayed or otherwise provided to the user (e.g., in a manner similar to that of FIG. 2D). In addition, in some embodiments some or all of such information 261b may be illustrated to the user that specified the expanded query terms 265b, although in the illustrated embodiment the information 261b is not displayed to the user.

In this example, information 261b includes additional entries 264c and 264d relative to the information 261a of FIG. 2C, which have been added to correspond to the two additional query terms. Accordingly, the resulting aggregate normalized document relevance numbers in entry 264y have been updated with respect to the previous document relevance numbers of entry 264x of FIG. 2C to reflect the addition of the two additional terms. In this example, the aggregate normalized document relevance information in entry 264y continues to be based on an average of the individual term relevance numbers for each of the four expanded query terms 265b, although in other embodiments the aggregate normalized document relevance scores may be calculated in other manners (e.g., using a weighted average). In this example, the addition of the two additional search terms has reduced the determined relevance for example document 3, which was previously determined to be the most relevant document in FIG. 2C for the initial query terms 265a. In particular, as shown in column 262c and entry 264y of information 261b, the revised document relevance score for document 3 has been reduced from the previous value of 84% to the current value of 47%. In addition, the relative relevance of example documents 1 and 2 has increased relative to the information in FIG. 2C, as shown in columns 262a and 262b of information 261b, such that document 1 is determined to be the most relevant document for the expanded query terms 265b, and document 2 is determined to be the second most relevant document for the expanded query terms 265b.

In this example, the changes in the document relevance numbers can be understood intuitively based on the general topics of the example documents and the theme specified using the expanded query terms 265b. In particular, relative to the two initial query terms 265a of FIG. 2C, the expanded query terms 265b of FIG. 2G appear to be less related to the general steroids-related controversy in Major League Baseball, and more related to information specific to Barry Bonds and his attainment of the home run record. Accordingly, the example document 1 news article related to Bonds setting the home run record has now become the most relevant document to the expanded query, and example document 4 that is related to the steroids controversy more generally has become much less relevant. Example documents 2 and 3 continue to be at least moderately relevant to the expanded query terms 265b, as the example document 2 biography related to Bonds and the example document 3 related to Bonds' indictment both include discussion of the home run record, and example document 2 mentions the prior record holder Hank Aaron.

FIG. 2H illustrates an alternative to that shown in FIG. 2G, in which the initial query terms 265a of FIG. 2C have been expanded in a different manner, so as to specify a group of expanded query terms 265c that include additional query terms "indictment" and "Canseco," as well as the prior terms "Bonds" and "steroids". Such expanded query terms 265c may, for example, reflect a theme of interest to the user that is, relative to the expanded query 265b of FIG. 2G, more related to Bond's alleged steroid use and the general steroids-related controversy in Major League Baseball, and less related to particular information about Bonds that is unrelated to his alleged steroid use. Accordingly, the information 261c of FIG. 2H is similar to information 261a and 261b of FIGS. 2C and 2G, respectively, but includes additional entries 264g and 264h corresponding to the two new query terms, and new entries 264z reflect revised document relevance numbers that are generated based on the new expanded query terms 265c. As would be intuitively expected, example documents 3 and 4, related to Bond's steroid-related indictment and Canseco's steroids-related testimony, respectively, are the most relevant documents among the example documents, while the relevance of example documents 1 and 2 that are not specific to the steroids controversy have significantly dropped.

In a similar manner to that of FIG. 2G, the illustrated information 261c may in at least some embodiments not be displayed to the user, but other information similar to that of FIG. 2D may be displayed to the user to illustrate a revised list of relevant documents based on the new query terms 265c. In addition, the feedback provided by the user by selecting additional query terms as shown in FIGS. 2G and 2H may be used in other manners in at least some embodiments, including as feedback to modify the determined relevance of particular documents and/or particular terms relative to the initial query terms 265a of FIG. 2C.

In addition, in the previously discussed examples, the example query terms 265a-265c have been specified in a relatively simple manner, in which the terms are listed without any indicated logical combination operation (e.g., AND, OR, etc.) or other indication of relative weighting or use. In other embodiments, other types of information may be specified for such search queries, and may be used in various ways. For example, in some other embodiments, users may be able to indicate not only query terms that are of interest, but may also be able to indicate query terms that are not of interest for a particular query or theme, and may also be allowed to modify an initial query in various other ways. For example, in a manner similar to that illustrated with respect to FIGS. 2E and 2F, information may be determined to reflect the least relevant other terms based on the initial query terms 265a, and such least relevant term information may similarly be displayed to the user to allow selection of terms to exclude from the expanded query. In such situations, the terms of interest may be combined with terms indicated to be excluded or that are otherwise not of interest in various ways. For example, with respect to the example of FIGS. 2C and 2D, query terms "Bonds" and "steroids" may be indicated to be of interest, but an expanded query term with the term "Canseco" indicated to be excluded may be specified. As shown in entry 264h of information 261c of FIG. 2H, the term "Canseco" is relevant only to document 4 of the example documents 1-5, and in particular has a document relevance number of 0.97 for document 4 in this example. Such information may be combined with the information 261a of FIG. 2C in various ways to treat the relevance of the excluded term "Canseco" to each of the documents as a reduction in overall document relevance number for the document based on the expanded query terms, such as by treating the term relevance value of an excluded term to a document as the negative of the term relevance value for an included term (along with expanding the range of possible values for the normalized document relevance numbers to be from −1 to 1). If so, a revised document relevance number of 0.01 may be generated for document 4 and the expanded query terms in this example, by taking an average of the individual term relevance numbers of 0.04 and 0.97 for "Bonds" and "steroids," along with the negative term relevance number of "−0.97" for "Canseco." It will be appreciated that relevance information about excluded terms and other terms that are not of interest may be used and combined with relevance information for terms of interest in other manners in other embodiments.

In addition, in a manner similar to that of FIG. 2D, in some embodiments a user may be allowed to specify one or more documents that the user considers to be particularly relevant to the query terms 265a, such as for use in determining other terms that are relevant to the query terms 265a and/or other documents that are relevant to the specified document (e.g., to request similar documents to the specified document). Alternatively, rather than listing particular other possible terms in the manner shown in FIG. 2F, one or more previously defined themes may instead be displayed to the user for possible selection and use in identifying further relevant documents. Such other defined themes may be specified in various ways, including a textual label (e.g., "Bonds career home run record") and/or using particular terms that are part of that defined theme (e.g., "Bonds, steroids, home run, Hank Aaron"). If particular defined themes are selected based on their relevance to the initial query terms 265a, at least some of the defined themes may not be based on at least one of the initially specified query terms 265a, such as to indicate a defined theme based on terms such as "Bonds, home run, Hank Aaron" but without "steroids," and another defined theme similar to that of query 265c. Similarly, in situations in which the user selects additional query terms to use as part of an expanded query, the user may further remove one or more of the prior query terms if so desired, such as to remove the term "steroids" in the example of FIG. 2G, or to indicate that such a term should be excluded as previously discussed. The determined term relevance and document relevance information may be similarly used in a variety of other manners in other embodiments.

As another illustrative example, techniques similar to those described above for query term expansion or other modification may also be used in situations in which an initially specified query term is misspelled or otherwise in a non-standard or atypical form (e.g., based on being in singular or plural form, based on a verb being in a particular tense, based on being in a different language, etc.). Thus, for example, if the query terms 276 of FIG. 2F were instead "bonds" and "staroids" (e.g., based on a user entering those terms but introducing uncertainty by misspelling "steroids" as "staroids" and by not capitalizing "Bonds"), the candidate other terms 279 may be expanded or otherwise modified to include additional terms related to addressing the uncertainty in the user-specified terms. With respect to "staroids," for example, one of the most relevant additional terms may be the term "steroids," such as for use instead of or in addition to "staroids." The additional term "steroids" may in some embodiments be identified based solely on a dictionary lookup for the unrecognized word "staroids" (e.g., optionally along with other suggested replacement terms, such as "asteroids," "toroids," etc.), although in other embodiments the previously discussed inter-term relevance techniques may be used to identify "steroids" as a possible or likely candidate for a replacement or supplementary term based on a previously identified relationship between the terms "staroids" and "steroids" (e.g., if "staroids" is a common misspelling of "steroids" by users) and/or based on a previously identified relationship between the terms "bonds" and "steroids." In a similar manner, in an effort to disambiguate the term "bonds," the additional terms may include choices such as "Barry Bonds," "stocks," "interest rates," "Bobby Bonds," etc., such as based on previously identified relationships between the term "bonds" and the other additional terms.

As previously noted, in some embodiments, an initial determination of the relevance of particular terms to particular documents and/or to particular other terms may be made based at least in part on using TF-IDF values or other information related to term frequency. In other embodiments, determinations of such relevance information may be made in other manners. As one example, the relevance of a particular term to one or more documents may be represented as a probability distribution or other distribution, and the respective distributions for two or more such terms may be compared to determine how similar those distributions are, as a measure of how related the respective terms are. Similarly, particular documents may each be represented as a distribution across multiple terms, and the respective distributions for two or more such documents may similarly be compared to determine how similar those documents are. Thus, for example, a search query with one or more terms and a document may be represented as a pair of probability distributions over desired and contained document terms, with a comparison of such probability distributions being performed for some or all documents in the corpus, so that the document having the most statistical information related to the query may be determined. As one example of performing such a comparison between two distributions, the Kullback-Leibler divergence statistical measure may be calculated to provide a convex measure of the similarity between two such distributions, while in other embodiments differences in statistical information entropy may be used to compare two such distributions. Additional details regarding performing examples of such comparisons are included below, and it will be appreciated that such comparisons may be performed in other manners in other embodiments.

In particular, the Kullback-Leibler divergence between two document-related or term-related distributions may be utilized to determine the similarity between the two distributions in some embodiments. The Kullback-Leibler divergence for two distributions P and Q may be expressed as follows, $$D_{KL}(P\|Q) = \sum_i P_i \log\left(\frac{P_i}{Q_i}\right)$$

where $P_i$ and $Q_i$ are values of the discretized probability distributions P and Q (e.g., for a document-related distribution for a document P, each $P_i$ may represent the percentage of words in document that match term i, may represent the degree of relevance of a particular term i to the document P, may represent the probability that term i is the most relevant term in document P, etc.). Other embodiments may use other statistical measures to compare two distributions, such as the difference between two statistical information entropy measures, whether instead of or in addition to a similarity measure such as from the Kullback-Leibler divergence. The statistical entropy of a probability distribution is a measure of the diversity of the probability distribution. Statistical entropy of a probability distribution P may be expressed as follows, $$H(P) = -\sum_i P_i \log P_i$$

where $P_i$ is a value of the discretized probability distributions P. The difference between two statistical entropy measures may then be measured by calculating the entropy difference measure. The entropy difference measure between two probability distributions P and Q may be expressed as the mutual information between the random variables as, $$I(P, Q) = \sum_{p \in P, q \in Q} p(p, q) \log\left(\frac{p(p, q)}{p(p)p(q)}\right)$$

where p(p) and p(q) represent the marginal distributions of P and Q, respectively, and where p(p,q) represents the joint distribution of P and Q. Alternatively, the entropy difference measure between two probability distributions P and Q could be expressed as, $$EM = \|H(P) - H(Q)\|^2$$

where H(P) and H(Q) are the entropies of the probability distributions P and Q, respectively, as described above.

In addition, as previously discussed, FIGS. 2A-2H illustrate examples of determining document-related relevance information and theme-related relevance information for a particular example group of documents, and using that relevance information in various manners. As discussed elsewhere, in some embodiments at least some of the determined relevance-related information may be represented in various particular manners, and may be updated to reflect user feedback and other changes. FIGS. 2I-2L illustrate particular examples of representing and revising determined document relevance information and term-related relevance information in various ways, and in particular in these examples by generating and updating neural networks that represent determined relevance-related information.

Figure 2I:
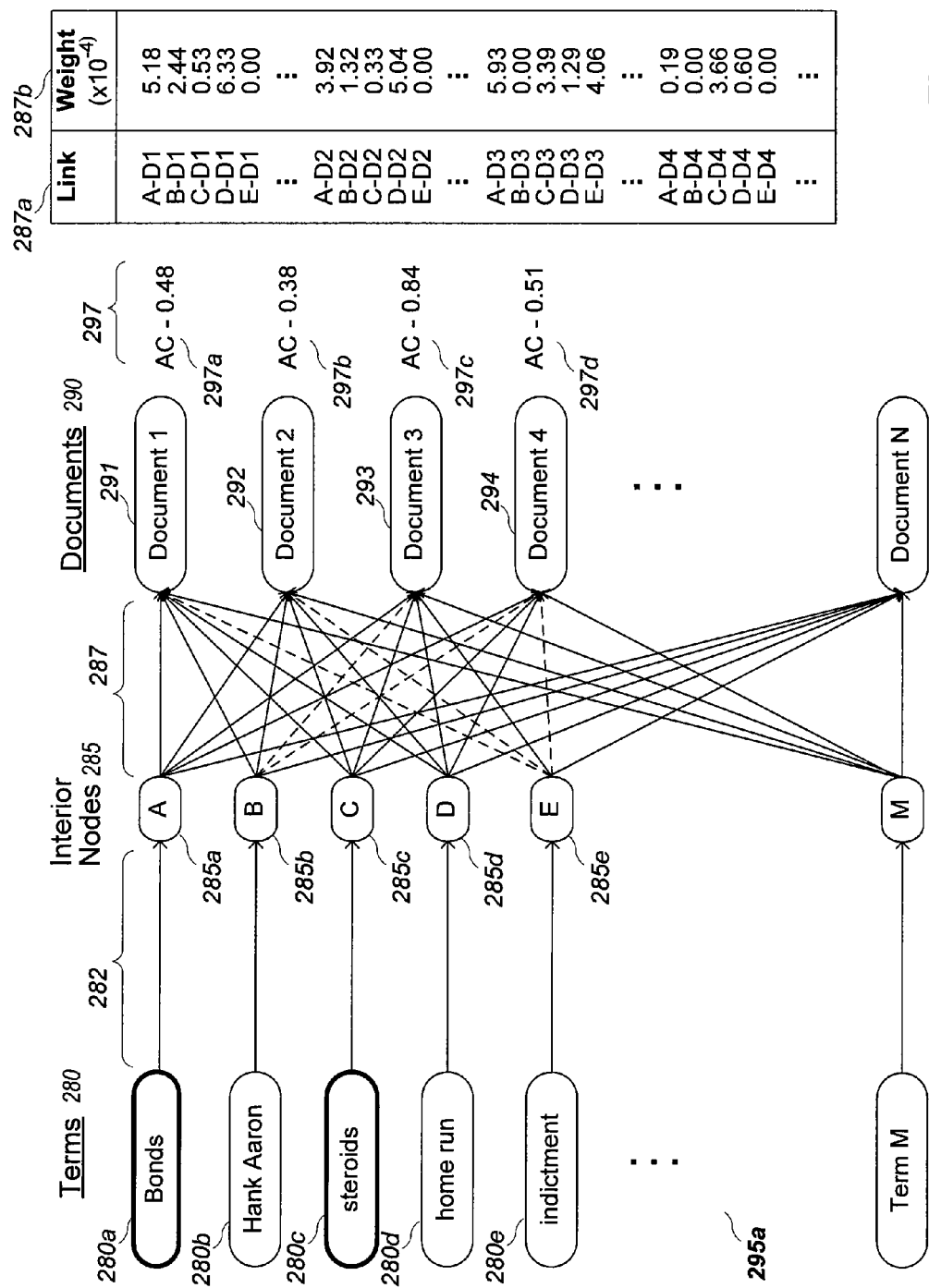

In particular, FIG. 2I illustrates an example neural network 295a that represents the relevance of particular documents to particular terms. In this example, the neural network 295a includes various input nodes 280 that correspond to terms identified for the corpus of documents, various output nodes 290 that represent documents in the corpus, and one or more layers of interior nodes 285 that represent calculations performed to generate document relevance numbers for particular output documents 290 based on particular input terms 280. While only a single set of interior nodes 285 are illustrated in FIG. 2I for the sake of simplicity, it will be appreciated that some such neural networks may have additional interior nodes. In addition, the links between nodes represent relationships between those nodes, and may include associated weights as discussed below.

As previously discussed with respect to FIG. 2C, a search query was specified that included two query terms 265a, those being "Bonds" and "steroids". Nodes 280a and 280c in FIG. 2I represent those terms in the generated neural network, and are illustrated in bold for the sake of recognition. In addition, in the example of FIG. 2C, normalized document relevance numbers 264x were determined for various documents in the corpus, including example documents 1-4, and those example documents 1-4 have corresponding nodes 291-294 in this example. In addition, information 297 is illustrated in this example to show the normalized document relevance numbers for those example documents 1-4 based on the two query terms 265a for this example, referred to as "AC" for shorthand to reflect the associated interior nodes 285a and 285c that correspond to the nodes 280a and 280c for those terms. Thus, for example, the illustrated normalized document relevance value 297a for document 1 based on the query terms 265a is a value of 0.48, as previously shown in column 262a for entry 264x of FIG. 2C. Similar information 297b-297d is illustrated for example documents 2-4.

In this example, the calculation of the document relevance numbers for the output documents 290 in the generated neural network is separated into two parts that correspond to the links 282 between the input terms 280 and the interior nodes 285, and the links 287 between the interior nodes 285 and the output documents 290. In addition, information 287a and 287b is illustrated to reflect information about the various links 287 that are shown, including by indicating an initial weight that is associated with each link based on the initial determined document relevance information. For example, with respect to the link between interior node A 285a and output node 291 corresponding to example document 1 (referred to in shorthand as link "A-D1" in the information 287a), that link is initially given a weight of 0.000518, or $5.18 \times 10^4$, as shown in information 287b. Similarly, with respect to the link between interior node C 285c and output node 291 (referred to in shorthand as link "C-D1" in the information 287a), that link is initially given a weight of 0.000053 in information 287b. In addition, the links 282 between input nodes 280a and 280c and interior nodes 285a and 285c, respectively, may be used to determine values of 1,641 and 2,075, respectively, based on the example term relevance information described in FIG. 2C, and as described in greater detail below. Thus, the normalized document relevance value 297a for example document 1 based on the query terms 280a and 280c may be determined from the neural network based on those two links A-D1 and C-D1, as well as on the interior nodes 285a and 285c, and on the links 282 between the input node 280a and interior node 285a and between the input node 280c and interior node 285c (e.g., by calculating 1641*0.000518=0.85 as the document relevance number for term "Bonds", by calculating 2075*0.000053=0.11 as the document relevance number for term "steroids", and with their average being 0.48, as illustrated in information 261a of FIG. 2C). Additional details regarding one example embodiment of generating such a neural network follows, including with respect to equations 1-5 below.

In particular, once the relevance of particular terms to particular documents has been determined (e.g., as reflected in the DR scores for the combination of those documents and those terms), that information may be represented in various ways, including using a neural network that may be updated based on user feedback and in other manners. Similarly, once the relevance of particular terms to other groups of one or more terms has been determined (e.g., such as based in part on relevant documents for some or all of those terms), that information may also be represented and updated in various ways, including using a similar neural network that may be updated based on user feedback and in other manners. The weights and/or other aspects of such neural networks (e.g., particular links) may be then modified to reflect feedback and other additional information that is obtained over time, such as to improve the relevance information provided by the neural network over time to reflect automated learning from the feedback and other additional information that may be obtained. The following illustrates one particular example of generating such neural networks and of updating weights in such neural networks, and other embodiments may use other related techniques.

As previously noted, the DR score (also referred to below as a "HDR score") for a document d relative to a group g of one or more specified terms i may be determined as follows in at least some embodiments.

$$DR(d, g) = \frac{1}{NTerms(g)} \sum_{i}^{g} \frac{TF.IDF_{i,d} - \min(TF.IDF_i)}{(\max(TF.IDF_i) - \min(TF.IDF_i))} \quad \text{Equation 1}$$

This DR formula may similarly be used to represent a set of neural network weights representing a linear combination, plus biases, of TF.IDF values for individual terms i in a query having a group g of one or more such terms i corresponding to a particular document j as follows.

$$HDR(j) = \sum_{i=1}^{g} [\beta_{ij} TF.IDF_{ij} - \gamma_i] \quad \text{Equation 2}$$

where $$\beta_{ij} = \frac{1}{NTerms(g) \cdot \left(\max_k TF.IDF_{ik} - \min_k TF.IDF_{ik}\right)},$$

and $$\gamma_i = \frac{\min_k TF.IDF_{ik}}{NTerms(g) \cdot \left(\max_k TF.IDF_{ik} - \min_k TF.IDF_{ik}\right)}.$$

Such neural network weights based on calculated DR scores may be used to initialize a generated neural network to correspond to the calculated DR scores.

Furthermore, using the definition of TF.IDF, where $x_{ij}$ is the Term Frequency of term i in document j, a TF.IDF value may be represented as follows:

$$TF.IDF_{ij} = -x_{ij} \log\left(\frac{\sum_j \sigma(x_{ij})}{N}\right) \quad \text{Equation 3}$$

where σ(x) is the Heaviside Function (whose value is zero if its argument x is negative and one if its argument x is zero or positive), and N is the number of documents in the corpus.

Therefore, substituting in HDR(j) results in the following:

$$HDR(j) = -\sum_{i=1}^{g} \left[\beta_{ij} x_{ij} \log\left(\frac{\sum_j \sigma(x_{ij})}{N}\right) - \gamma_i\right] \quad \text{Equation 4}$$

For a query having a group g of one or more terms t, the term frequencies in the document may be viewed as the weights of those terms in a projection into each document, and then for a given query a set of weights $U_{ij} = \beta_{ij} * x_{ij}$ and coefficients $\alpha_i$ may be defined such that a relevance Neural Network may generally be expressed as follows, $$HDR(j) = h_j = -\sum_{l=1}^{NTerms} [U_{lj} t_l \log(\alpha_l t_l) - \gamma_l] \quad \text{Equation 5}$$

and initialized with weights such that it implements TF.IDF query relevance scoring, where $$U_{ij} = \frac{x_{ij}}{NTerms(g) \cdot \left(\max_k TF.IDF_{ik} - \min_k TF.IDF_{ik}\right)},$$

$$\gamma_i = \frac{\min_k TF.IDF_{ik}}{NTerms(g) \cdot \left(\max_k TF.IDF_{ik} - \min_k TF.IDF_{ik}\right)},$$

and $$\alpha_l = \frac{\sum_j \sigma(x_{ij})}{N}.$$

Such weights U correspond generally to the weights 287b of FIG. 2I for links 287 between interior nodes 285 and output document nodes 290.

Furthermore, as previously noted, such a generated neural network may be updated to reflect feedback and other information that indicates additional relevance-related information for the domain. For example, a quadratic error function may be used over a set of training examples {t, h}, as follows:

$$E = \sum_{examples} \left[-\sum_{l=1}^{NTerms} [U_{lj} t_l \log(\alpha_l t_l) - \gamma_l] - h\right]^2$$

Back-propagation rules for updating the network weights by stochastic gradient descent may then be derived. Accordingly, the derivatives of E with respect to the weights of the model may be calculated, as follows:

$$\frac{\partial E}{\partial U_{lj}} = 2 \sum_{Examples} \left[-\sum_{l=1}^{NTerms} [U_{lj} t_l \log(\alpha_l t_l) - \gamma_l] - h\right] \cdot t_l \log(\alpha_l t_l)$$

$$\frac{\partial E}{\partial \alpha_l} = 2 \sum_{Examples} \left[-\sum_{l=1}^{NTerms} [U_{lj} t_l \log(\alpha_l t_l) - \gamma_l] - h\right] \cdot \frac{U_{lj}}{\alpha_l}$$

$$\frac{\partial E}{\partial \gamma_l} = -2 \sum_{Examples} \left[-\sum_{l=1}^{NTerms} [U_{lj} t_l \log(\alpha_l t_l) - \gamma_l] - h\right]$$

Training cases may be developed in various manners in various embodiments, including by using user selection of a given document to set a target value of $h_j$ equal to or some percentage greater than the value for the current most relevant document.

When a generated neural network is expanded to reflect inter-relationships between terms, such as may be useful for disambiguating between multiple overlapping or otherwise related themes, learning may be performed in various manners in various embodiments. The example neural network 295c of FIG. 2K illustrates such an expanded neural network, in which new term-based output nodes 283 are illustrated, with new links 296 between the document-based nodes 290 and the new term-based output nodes 283. For example, in such situations, it is possible to choose either to keep the term frequency weights V fixed, or instead to adapt both weights U and V via back-propagation. As previously noted, the weights U correspond generally to the links 287 between interior nodes 285 and document nodes 290, with exemplary weights 287b illustrated in FIG. 2I, and the weights V correspond generally to the links 296 between document nodes 290 and term-based output nodes 283, with exemplary weights 296b illustrated in FIG. 2K.

In such a situation, one further feed-forward step is used for the links between the document-based nodes 290 and new term-based output nodes 283, for the purpose of disambiguation d, as follows:

$$d_i = \sum_j V_{ij} h_j,$$

initialized with $V_{ij} = x_{ij}$

In the situation in which weights V are fixed, the weights V may be inverted and applied to the new d to obtain appropriate feedback values of h. Alternatively, weights U and V and $\alpha_l$ and $\gamma_l$ may be modified with an updated error function $E^{(d)}$, as follows:

$$E^{(d)} = \sum_{Examples} \left[ -\sum_j V_{ij} \left[ \sum_{l=1}^{NTerms} U_{lj} I_l \log(\alpha_l I_l) - \gamma_l \right] - d \right]^2$$

Then the gradient descent learning rules have the form as follows:

$$\frac{\partial E^{(d)}}{\partial V_{ij}} = 2 \sum_{Examples} \left[ -\sum_j V_{ij} \left[ \sum_{l=1}^{NTerms} U_{lj} I_l \log(\alpha_l I_l) - \gamma_l \right] - d \right] \cdot$$

$$\left[ -\sum_{l=1}^{NTerms} U_{lj} I_l \log(\alpha_l I_l) - \gamma_l \right]$$

$$\frac{\partial E^{(d)}}{\partial U_{lj}} = 2 \sum_{Examples} \left[ -\sum_j V_{ij} \left[ \sum_{l=1}^{NTerms} U_{lj} I_l \log(\alpha_l I_l) - \gamma_l \right] - d \right] \cdot V_{ij} I_l \log(\alpha_l I_l)$$

-continued $$\frac{\partial E^{(d)}}{\partial \alpha_l} = 2 \sum_{Examples} \left[ -\sum_j V_{ij} \left[ \sum_{l=1}^{NTerms} U_{lj} I_l \log(\alpha_l I_l) - \gamma_l \right] - d \right] \cdot \sum_j \frac{V_{ij} U_{lj}}{\alpha_l}$$

$$\frac{\partial E^{(d)}}{\partial \gamma_l} = -2 \sum_{Examples} \left[ -\sum_j V_{ij} \left[ \sum_{l=1}^{NTerms} U_{lj} I_l \log(\alpha_l I_l) - \gamma_l \right] - d \right]$$

In addition, the range of learned parameters may be constrained by implementing a 'weight decay' regularization in at least some embodiments. As such, this results in adding quadratic terms to E and $E^{(d)}$ in U, V, $\alpha_l$ and $\gamma_l$. The derivatives on the different weights therefore result in linear terms in the gradients of E and $E^{(d)}$ in the weights causing gradient descent to effect and exponential decay in them in the absence of an error signal based on difference to the target values of h or d. Thus for w (any network weight U, V, $\alpha_l$ and $\gamma_l$) an additional term $$\frac{\partial \Delta E}{\partial w} = \epsilon w$$

may be added to the gradient, where $\epsilon$ is a parameter.

While particular details have been described with respect to embodiments for generating and updating such neural networks, it will be appreciated that other neural networks may be generated and/or updated in other manners in other embodiments.

Figure 2J:
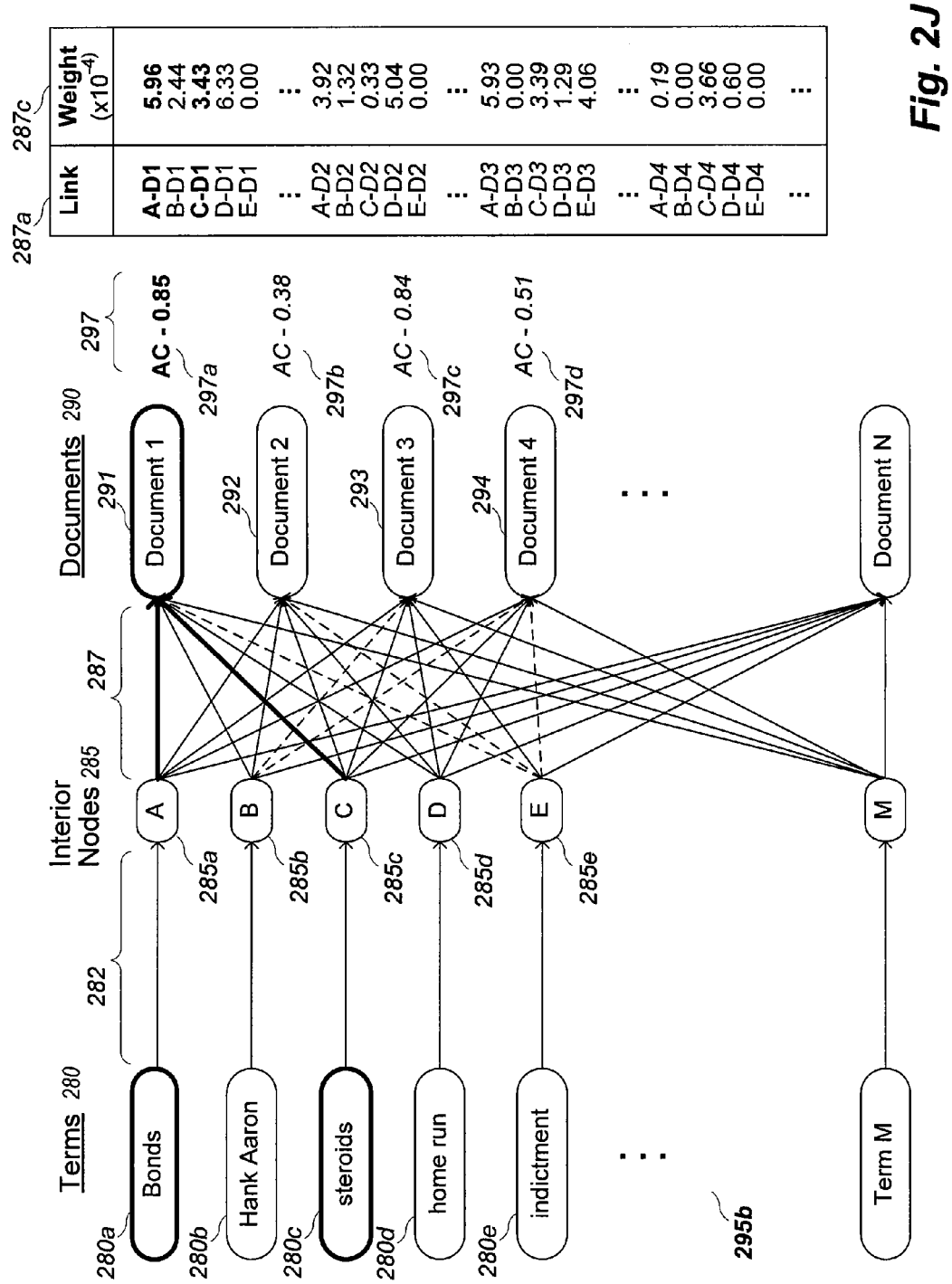
Figure 2K:
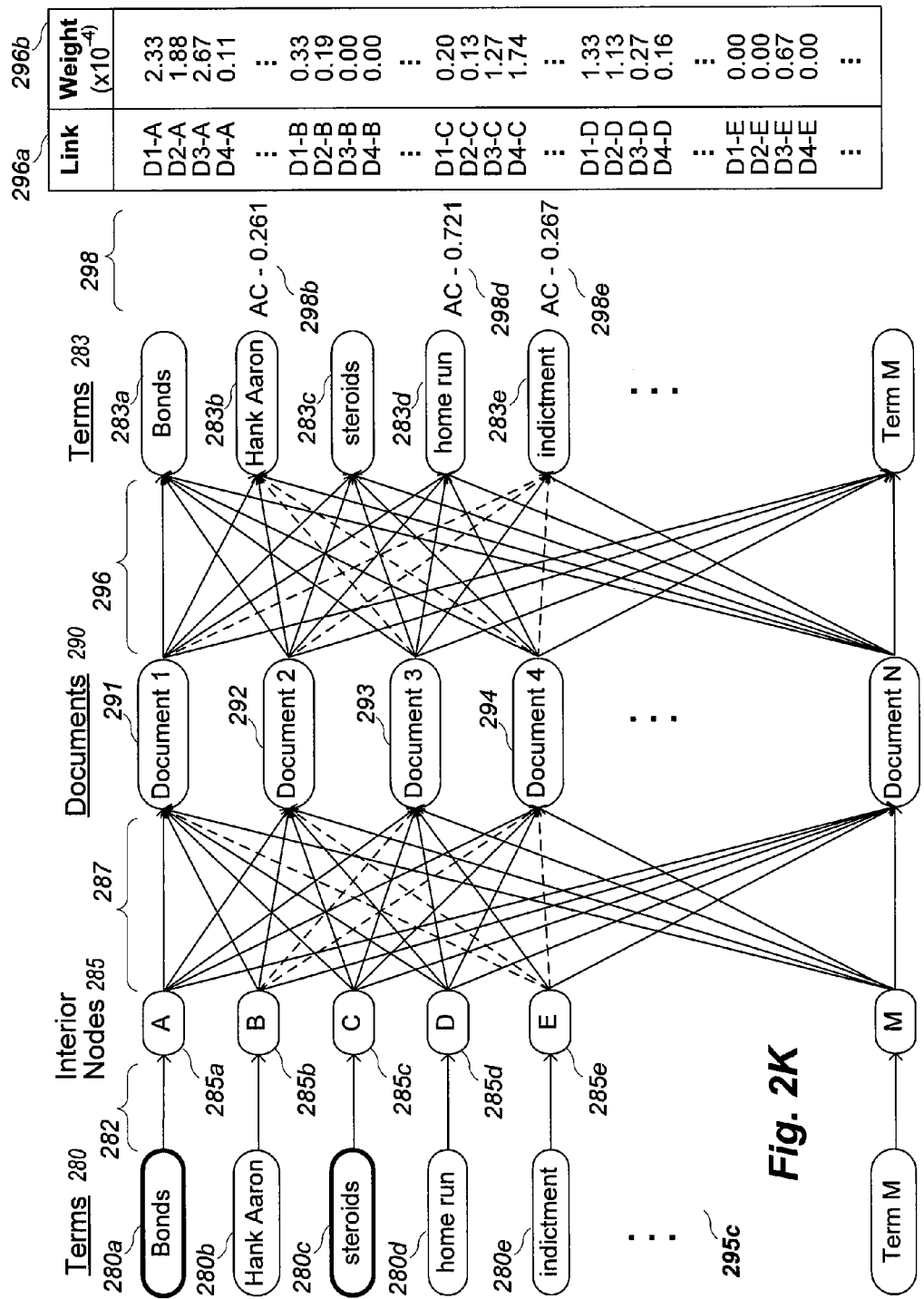

Returning to the examples previously described with respect to FIGS. 2A-2I, FIG. 2J continues those examples, and in particular illustrates changes that may occur for the neural network 295a of FIG. 2I over time based on feedback related to use of the determined relevance information for the corpus. In particular, a modified neural network 295b is illustrated in FIG. 2J, in which modifications have been made to the normalized document relevance value of example document 1 for the query terms 280a and 280c. Such changes may be based on, for example, repeated selection by users of example document 1 for review or other use after query terms 280a and 280c have been specified, such as to reflect implicit user feedback that example document 1 is the most relevant document that corresponds to those specified terms, or instead explicit feedback from users that indicates such relevance of example document 1. Accordingly, in this example the document relevance number 297a for example document 1 has been modified so that document 1 is the most relevant of all the example documents based on the user feedback, such as in this example by modifying the normalized document relevance number to be equal to or above the most relevant other document by a specified margin (e.g., by 0.01 in this example). In addition, to reflect the higher normalized document relevance number 297a, the value of links A-D1 and C-D1 have been modified, as shown in modified information 287c. In this example, the modified link weights and document relevance number 297a are shown in bold for the sake of convenience, as well as the visual representations of the links A-D1 and C-D1. It will be appreciated that the modifications to the weights for links A-D1 and C-D1 to reflect the increased document relevance value 297a may be distributed between those links in various ways, such as by increasing the link weights equally or proportionally to correspond to the increased document relevance number. Alternatively, in other embodiments the learning may cause particular link weights to be updated, and updated document relevance numbers may instead be generated to correspond to those updated link weights.

In addition, while not illustrated in FIG. 2J, in some embodiments the modification of the document relevance score for example document 1 and/or the modification of the link weights for links A-D1 and C-D1 may further cause modifications to other generated document relevance numbers and/or link weights. For example, when the relevance of example document 1 is increased for the specified terms 280a and 280c, the relevance of other example documents 2-4 may be lowered with respect to those specified terms 280a and 280c to reflect a lower relative relevance value. If so, the determined document relevance numbers 297b-297d may be lowered in various manners (e.g., proportionally), and corresponding link weights for the links between interior nodes 285a and 285c and those other example documents 2-4 may be lowered. Such other information that may be lowered in this example is shown in italics for the sake of convenience, although the example values have not been adjusted in FIG. 2J. In addition, it will be appreciated that in some situations a particular term may be determined to have no relevance to a particular example document, such as with respect to the term "indictment" as represented in input node 280e and the example document 1, as reflected in the value 212e in row 214j for that term and document in FIG. 2A. If so, the link between the interior node 285e and the node 291 corresponding to the example document 1 may not be present, or instead may be present but with a weight value of 0. In this example, the links 287 that have 0 value weights and may not be present are shown using dashed lines. It will be appreciated, however, that a particular link such as E-D1 may initially be determined to have a weight of 0 and no relevance to a particular document such as example document 1, but learning and other modifications over time to the determined relevance information for the domain may indicate that some relevance does exist between that term and that document, and if so the corresponding link and associated weight in the modified neural network may be modified to reflect that modified determined relevance.

In addition, while not illustrated here, in some embodiments neural networks such as 295a and 295b of FIGS. 2I and 2J may be modified in other manners after they are created. For example, if additional documents for the corpus become available after a neural network for the corpus has been generated and/or updated, in some embodiments the additional documents may be incorporated into the existing neural network in various manners without re-generating the entire neural network. As one example, new output nodes 290 may be created for such new documents and new links 287 may be generated between the interior nodes 285 and output document nodes 290. Furthermore, the weights to be assigned to the new links 287 may be determined in various manners, such as by initializing those weights based on initial determined relevance values for existing terms to the new documents, by taking an average of corresponding link weights that are already in the neural network or otherwise generating the new link weights based on some or all of the existing link weights, by determining the most similar other existing documents (e.g., by assessing document similarity using the Kullback-Leibler divergence statistical measure, as previously discussed, or instead in another manner) and initializing link weights and/or document relevance values for the new documents based on the most similar other existing documents (e.g., to take the average of the corresponding values for the most similar other existing documents), etc.

FIG. 2K illustrates an example neural network 295c that is similar to the neural network 295a of FIG. 2I, but reflects additional determined theme-related relevance information for the corpus. In particular, in this example, the neural network 295c includes similar input nodes 280 corresponding to terms, interior nodes 285 and document nodes 290 corresponding to determined normalized relevance numbers for the documents based on the input terms, but further includes additional output nodes 283 that correspond to the terms for the corpus, as well as additional links 296 between the document-related nodes 290 and the new term-related output nodes 283. As discussed in greater detail elsewhere, in some embodiments the determination of relevance between one or more first terms and one or more other terms may be based at least in part on documents that are determined to be relevant to the first terms, such as to identify possible other relevant terms using those documents. In this example, additional information 296a and 296b is shown to reflect the weights of the links 296, in a manner similar to that previously described with respect to FIG. 2I.

The initial state of this example neural network 295c corresponds to the example of FIG. 2E, in which the relevance of other terms is determined based on the example initial query terms 265a. Thus, for example, the displayed information 298 in FIG. 2K includes indications of determined relevance of particular other output terms 283 based on the input terms 280a and 280c (shown in hold for the sake of convenience), such as the term relevance number 298b for output term 283b for term "Hank Aaron" that corresponds to information 272e for entry 274c in FIG. 2E. Term relevance numbers 298d and 298e similarly indicate term relevance numbers determined for output terms "home run" 283d and "indictment" 283e based on the input terms 280a and 280c.

Figure 2L:
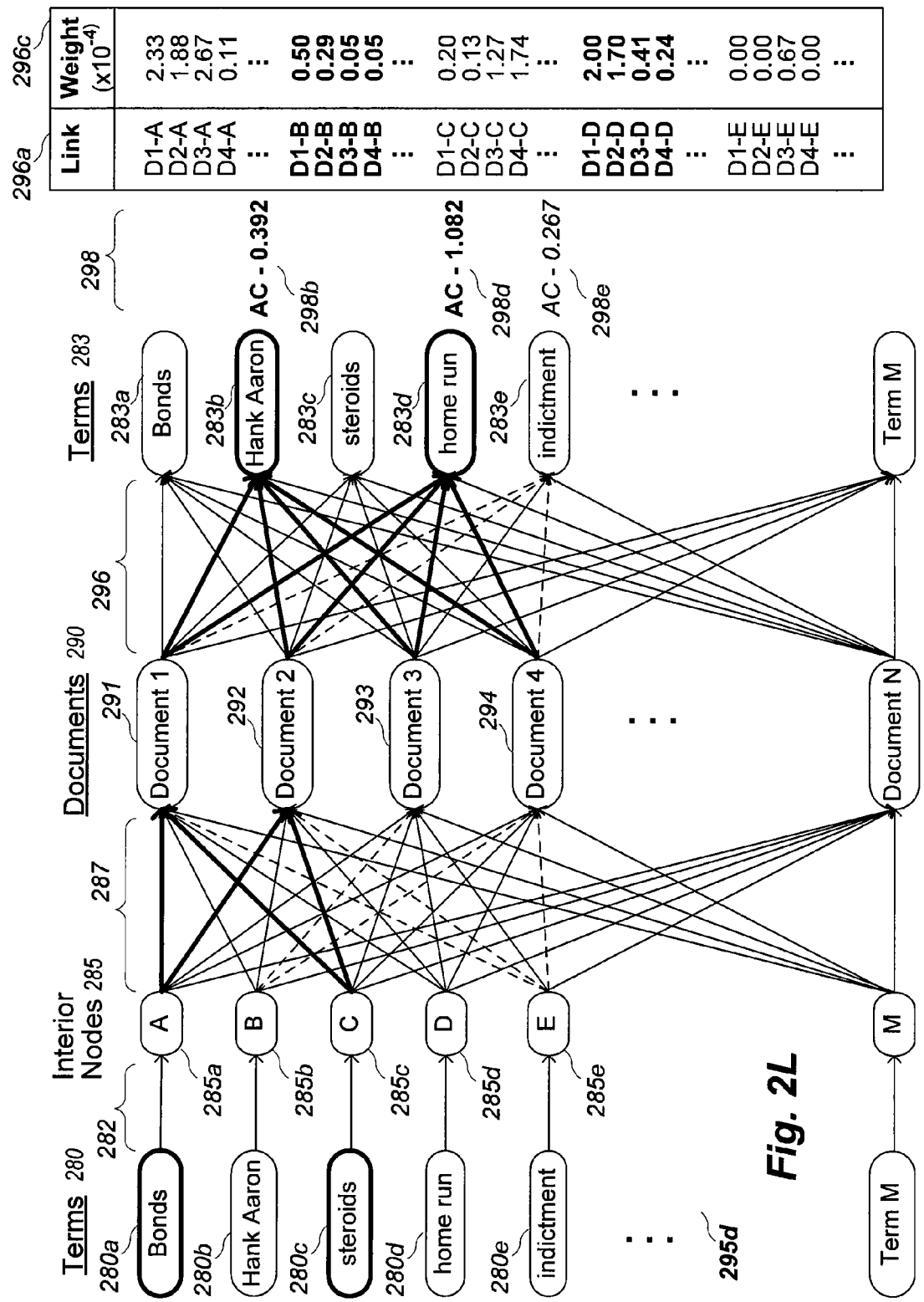

In a manner similar to that of FIG. 2J, FIG. 2L illustrates a modified neural network 295d that shows changes to the neural network 295c of FIG. 2K corresponding to learned changes in the relevance of particular output terms to particular input terms. In this example, the input terms of current interest continue to be the query terms 265a corresponding to input nodes 280a and 280c, and the determined relevance of output terms "Hank Aaron" 283b and "home run" 283d has been modified to reflect a learned increase in the relevance of those output terms with respect to those input terms. For example, as illustrated in FIG. 2G, a number of users may have selected the additional terms "Hank Aaron" and "home run" for use in expanded queries with the terms "Bonds" and "steroids," as was previously discussed with respect to the example of FIG. 2G. In this example, revised term relevance numbers 298b and 298d have been selected for output nodes 283b and 283d, respectively, which in this example correspond to a 50% increase in the relevance numbers for these two output terms based on the two input terms. In addition, the corresponding link weights have been modified accordingly, which in this example correspond to the links from each of the subset of documents that were determined to be most relevant to the input terms 280a and 280c (which in this example include example documents 1-4 as described in FIGS. 2C and 2D) to the affected output term nodes 283b and 283d. The term relevance numbers 298 and links 296 that have been modified in this example are shown in bold for the sake of convenience.

In addition, in some embodiments the weights associated with some of the links 287 may similarly be modified, either instead of or in addition to the modifications to the links 296, such as to increase the weights for the links between the interior nodes 285a and 285c and one or more of the example documents 1-4 to accommodate some or all of the increased relevance of the output terms 283*b* and 283*d* for the input terms 280*a* and 280*c*. In addition, it will be noted that the weights of links D3-B and D4-B have been increased from having 0 values in FIG. 2K to having small associated weights in this example, although in other embodiments such weights with 0 values may not be increased.

It will be appreciated that the various weights, relevance numbers, and other information illustrated for the example neural networks 295*a*-295*d* are provided for the sake of illustration, and may have other forms and may be modified in other manners in other embodiments. In addition, the information illustrated in the examples of FIG. 2A-2L has been provided for illustrative purposes only, and it will be appreciated that various of the activities described may be performed in other manners in other embodiments. In addition, various other details have been shown in an abstract manner or not illustrated for the sake of understanding. Furthermore, various other types of functionality may be provided and used by a DSRD service in various embodiments, as discussed in greater detail elsewhere. It will also be appreciated that while a small number of terms, documents, and neural network nodes are illustrated, in actual embodiments the actual quantities may be much larger, such as to include hundreds of thousands of terms and millions of documents, with corresponding numbers of neural network nodes.

While the examples of FIGS. 2A-2L are based on analyzing terms that are present in textual documents or other content items, it will be appreciated that the described techniques may be used in other manners and with other types of content. In particular, a corpus of content items with other types of content may be analyzed in order to identify any other type of recognizable feature or property or other attribute that is part of the contents of those content items or that is otherwise associated with those content items, and the relevance of particular attributes to content and/or to other such attributes may be determined in manners similar to those discussed for textual terms. A non-exclusive list of such content item attributes includes the following: a type of a content item (e.g., an audio stream or file, a video stream or file, an image etc.); a source of a content item; a particular object in image or video content; a particular pattern of information in a stream or file content item; a particular type of metadata associated with a content item; etc. Such attributes may each be treated as a term, such as to provide search results that are relevant to specified attributes and/or to define themes or other groups of one or more related attributes.

In addition, while the examples of FIGS. 2I-2L use neural networks and back propagation learning to improve determined relevance information over time, in other embodiments other types of machine learning techniques or adaptive systems may instead be used. As one example, in some other embodiments the initial determined relevance information may be represented using a probabilistic Bayesian neural network that has a similar structure to that discussed in the examples of FIGS. 2I-2L, but with the node values representing conditional probabilities based on corresponding input values from preceding linked nodes in the network, with probabilistic belief propagation used to determine particular relevance values, and with learning involving updating conditional probability values to correspond to feedback over time.

In addition, while examples are previously discussed with respect to a user specifying query terms or preference information, other types of information may be used in various manners in various embodiments. For example, a group of information that is specific to a user may be automatically analyzed and used to determine preference information for that user, which may then be used to automatically determine other content that is relevant to that preference information. Non-exclusive examples of such user-specific information that may be analyzed include groups of email and other communications (e.g., all email that a user has sent and/or received for a specified period of time), logs or histories of user actions of various types (e.g., histories of searches that are performed and/or interactions with resulting search results), information about a user's social networks and other relationships, etc. Alternatively, one or more such groups of user-specific information may instead in some embodiments be treated as a corpus of documents that may be of interest to that user (and/or to others), such as automatically determine themes of interest to the user based on an analysis of such user-specific information, and/or to allow retrieval of particular pieces of such user-specific information that is relevant to current interests of the user.

For example, a user may be accessing a document, and the context of information from that document may be used to identify other relevant content items (e.g., from that user's computing system, from the Internet or other external network or data store, etc.). As one specific illustrative example, a user John Doe may be editing his/her resume, and may desire to obtain relevant work history data or other related data from the user's email store and the Web. The email store may, for example, have emails related to past work done by the user for Company 1 and Company 2, with the headers of those emails including the respective company names. A data store for the user (whether local or remote) may also contain one or more past resumes of the user or resume examples, and a work-related social networking site may have a history of the user's past employment. In such a situation, the context that the particular user has the resume open may be used to automatically expand or supplement a search that the user specifies with the query term "Doe," such as to add one or more of the additional query terms "John," "Company 1," "Company 2," "resume," job title or description information from the resume, geographical location information for the user from the resume or from other stored profile or preference information for the user, etc. The expanded search may then identify various types of relevant documents or other information, such as the emails related to past work done by the user for Company 1 and Company 2, other stored documents related to Company 1 and Company 2, the past resumes or resume examples, the employment history information from the work-related social networking site, etc.

Furthermore, as described in greater detail elsewhere, the described techniques may be used in situations other than identifying or retrieving relevant content items. For example, an automated analysis of a first group of content items may be used to identify themes that correspond to types or categories of data in the content items of the first group (e.g., based on the data having matching or similar patterns), and those identified themes may be used to categorize or otherwise determine a type of another data item that is used as a query term. As one illustrative example, various types of encrypted data may be analyzed, such that themes are identified that correspond to types of encryption schemes. If an encrypted file or other piece of encrypted data is later supplied or otherwise specified, the DSRD service may automatically be used to identify one or more of the most likely encryption schemes used to encrypt that specified data piece. More generally, the identified themes from a first group of content items may be types of valid solutions that are relevant to a subject area, so that later queries may pose some type of mathematical or other problem for which one or more corresponding identified themes are automatically determined as possible solutions. It will be appreciated that the described techniques may similarly be used in a variety of other manners.

Figure 3:
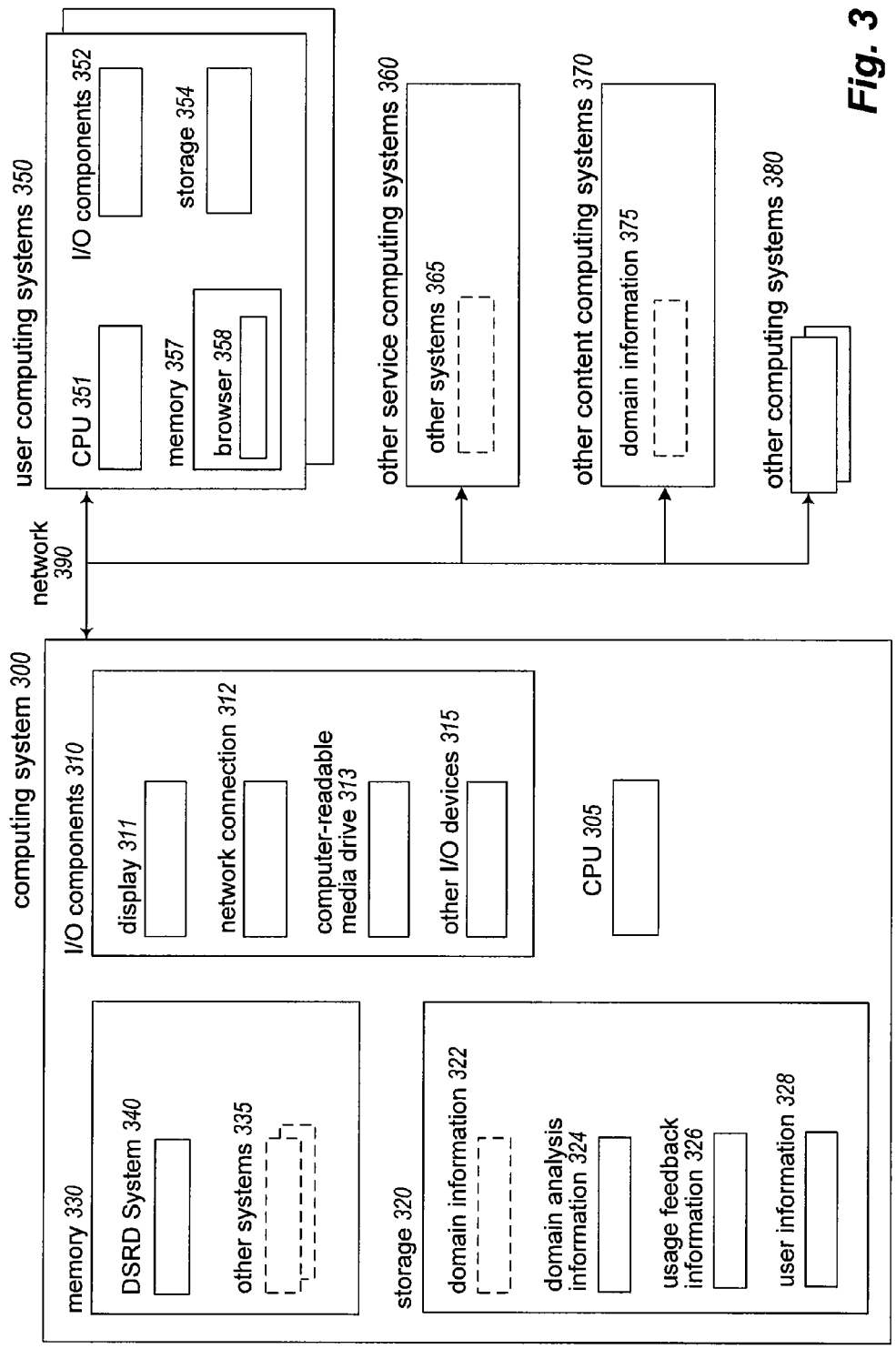
FIG. 3 is a block diagram illustrating an example of a computing system for use in the determination of relevance information related to domains of interest.

FIG. 3 is a block diagram illustrating an example embodiment of a system suitable for performing techniques to determine relevant information related to domains of interest. In particular, FIG. 3 illustrates a computing system 300 suitable for executing an embodiment of a DSRD system 340, as well as various user computing systems 350 and other computing systems 360, 370 and 380. In the illustrated embodiment, the computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357, although some details are not illustrated (e.g., particular I/O components). The other computing systems 360, 370 and 380 may also each include similar components to some or all of the components illustrated with respect to computing system 300, but such components are not illustrated in this example for the sake of brevity.

The DSRD system 340 is executing in memory 330, such as to provide an embodiment of the DSRD service. In particular, the DSRD system 340 interacts with some or all of computing systems 350, 360, 370 and 380 over the network 390 (e.g., via the Internet and/or the World Wide Web, via a private cellular network, etc.) to obtain information and requests, and to provide information in response. For example, the DSRD system 340 in this example receives requests from various users (not shown) who are interacting with user computing systems 350, such as requests to provide requested search results and/or information about determined themes for a domain, and responds accordingly. In addition, one or more of the user computing systems 350 may interact with DSRD system 340 to perform various other types of actions, such as to provide various types of feedback regarding user actions, as discussed in greater detail elsewhere. The other computing systems 350 may be executing various software as part of interactions with the DSRD system 340. For example, user computing systems 350 may each be executing a Web browser 358 or other software in memory 357 to interact with DSRD system 340, such as to interact with a Web-based GUI of the DSRD service provided by the DSRD system 340.

In order to determine domain-specific relevance information, the DSRD system 340 obtains domain-specific documents or other content from one or more sources, and analyzes that information to automatically determine the domain-specific relevance information. The sources of the domain-specific content may vary in various embodiments, such as to optionally include domain-related information 322 on local storage 320, optional domain information 375 on other computing systems 370, information supplied for analysis by one or more users from user computing systems 350 and/or from optional other systems 365 on other computing systems 360; etc. The optional other systems 365 on other computing systems 360 and/or the optional other systems 335 executing in memory 330 may have various forms in various embodiments, such as affiliated services that obtain determined relevance information from the DSRD system 340 and use that obtained information in various ways (e.g., to interact with users of the user computing systems 350), and/or content provision services that provide content to the DSRD system for analysis. For example, a particular optional other system 365 may maintain and provide domain information to the DSRD system 340 for analysis, and obtain and use resulting determined relevance information from the DSRD system 340, but with at least some of the information that is used by the DSRD system 340 in the determination of the relevance information (e.g., textual analysis information, generated neural networks, etc.) being stored on the computing system 300 and not provided to the other system 365. Alternatively, in other embodiments, the DSRD system 340 may generate and use determined relevance information for one or more domains without interacting with any such optional other services. Furthermore, one or more optional other third parties may use one or more of the other computing systems 380 and interact with the DSRD service in various other manners.

Various information related to the operation of the DSRD system 340 may be stored in storage 320 or elsewhere (e.g., remotely on one or more other computing systems 380), such as information 322 related to one or more domains of interest (e.g., domain-specific content to be analyzed or that has already been analyzed), information 324 related to the results of the analysis of domain-specific content (e.g., domain-specific relevance information, such as generated neural networks; determined scores and other information related to particular terms and themes and documents; etc.), information 326 to reflect information about users' interactions with various domain-specific information and other feedback information, and various user information 328 (e.g., preferences). In other embodiments, some or all of the information used by or generated by the DSRD system 340 may be stored in other manners, including on other computing systems 380 or on other storage nodes/systems (not shown). The DSRD system 340 may obtain the feedback information 326 in various manners, such as by generating the information based on interactions of the DSRD system 340 with users (e.g., when providing them with determined relevance information), from optional other systems 335 and/or 365 that interact with users and that provide those users with determined relevance information from the DSRD system 340, by one or more systems interacting with users for the purpose of generating feedback information, etc.

It will be appreciated that computing systems 300, 350, 360, 370 and 380 are merely illustrative and are not intended to limit the scope of the present invention. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system may comprise any combination of hardware or software that may interact and perform the described types of functionality, including without limitation desktop or other computers, database servers, network storage devices and other network devices, PDAs, cellphones and wireless phones and other phone systems, pagers, electronic organizers, Internet appliances, television-based systems (e.g., using set-top boxes and/or personal/digital video recorders), broadcast systems, and various other consumer products that include appropriate communication capabilities using any appropriate communication protocol. In addition, the functionality provided by the illustrated DSRD system 340 may in some embodiments be distributed in various modules. Similarly, in some embodiments some of the functionality of the DSRD system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. Some or all of the modules, systems and data structures may also be stored (e.g., as software instructions or structured data) on a computer-readable medium, such as a hard disk, a memory, a network, or a portable media article to be read by an appropriate drive or via an appropriate connection, including as encoded in one or more barcodes or other related codes stored on one or more such computer-readable mediums and being readable by an appropriate reader device. The systems, modules and data structures may also be transmitted as generated data signals (e.g., as part of a carrier wave) on a variety of computer-readable transmission mediums, including wireless-based and wired/cable-based mediums, and may take a variety of forms, or more generally may be mediated on any computer-readable medium. Such computer program products may also take other forms in other embodiments. Accordingly, the present invention may be practiced with other computer system configurations.

Figure 4:
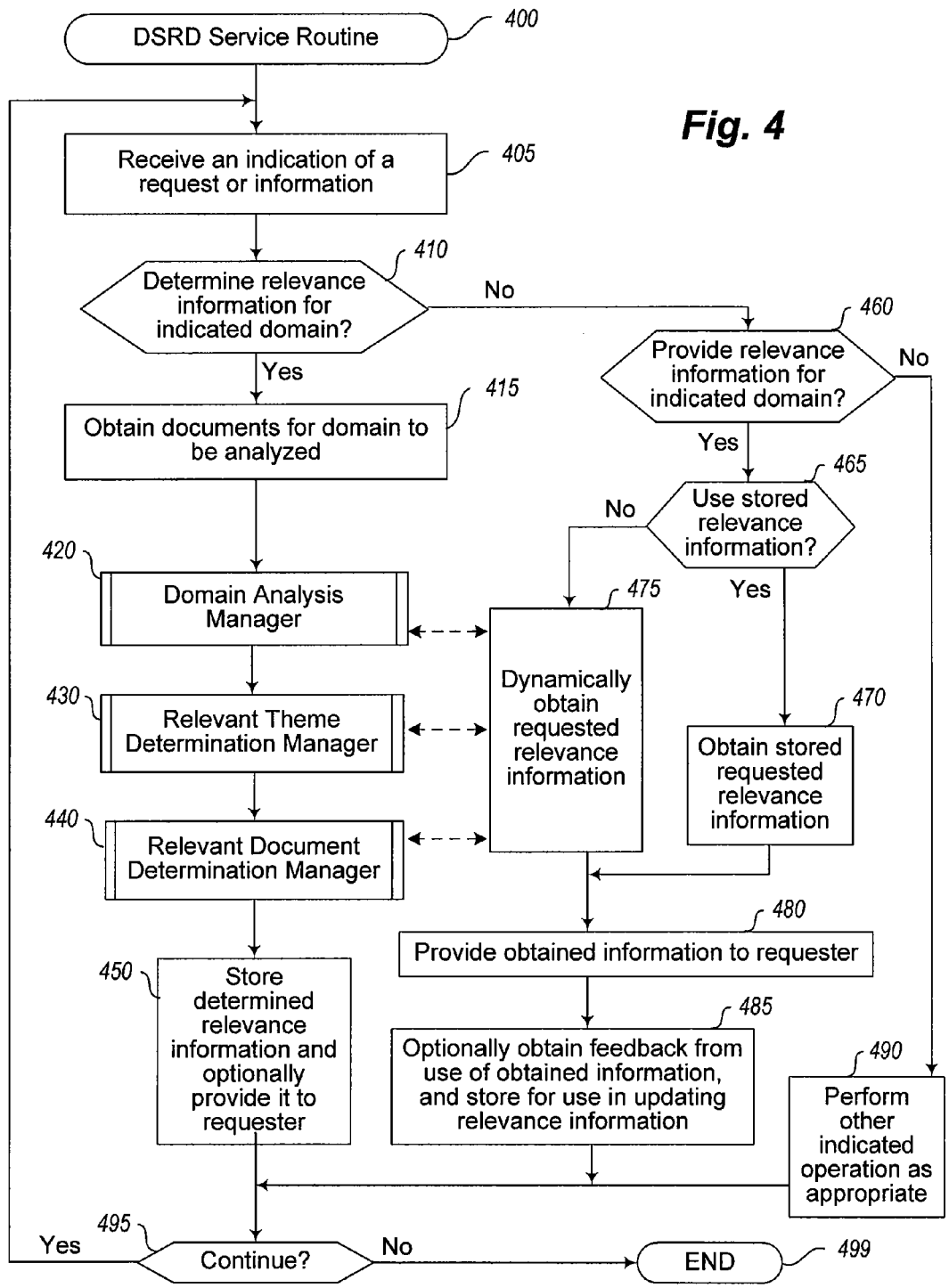
FIG. 4 illustrates a flow diagram of an example embodiment of a Domain-Specific Relevance Determination Service routine.

FIG. 4 is a flow diagram of an example embodiment of a DSRD Service routine 400. The routine may be provided by, for example, execution of the DSRD service 105 of FIGS. 1A and 1B and/or the DSRD system 340 of FIG. 3, such as to manage the determination of relevance information related to domains of interest, as well as corresponding interactions with users or other entities. In the illustrated embodiment, the routine analyzes information about one or more domains of interest at various times, such as to pre-process information about a particular domain (e.g., as instructed by a human operator of the DSRD service, as requested by a third-party entity, etc.) to determine at least some types of domain-specific relevance information for use in responding to later requests based on such information, or instead to dynamically generate at least some types of domain-specific relevance information in response to requests from users or other entities in at least some situations.

In the illustrated embodiment, the routine begins at block 405, where an indication of a request or other information is received. The routine continues to block 410 to determine whether a request is received to determine relevance-related information for an indicated domain or if domain-specific content to be analyzed has been provided, and if so continues to block 415. In blocks 415-450, the routine then analyzes domain-specific information in order to determine relevance-related information for the domain, and stores that information for later use. In addition, while blocks 415-450 are illustrated as performing an initial determination of relevance-related information for a domain of interest, in at least some embodiments some or all of blocks 415-450 may similarly be performed to modify previously determined relevance information, such as to revise the previously determined relevance information based on user feedback and/or to expand the previously determined relevance information based on newly available domain-specific content.

In particular, the routine in block 415 obtains documents or other domain-specific information for the domain to be analyzed, such as based on documents currently received in block 405, documents previously received and stored for later use, documents retrieved from an external location indicated in the request received in block 405, etc. After block 415, the routine continues to block 420 to perform a Domain Analysis Manager routine to analyze term information for the available domain-specific content, with one example of such a routine being illustrated with respect to FIG. 5. After block 420, the routine continues to block 430 to perform a Relevant Theme Determination Manager routine to determine relevant theme-related information for the domain, with one example of such a routine being illustrated with respect to FIG. 6. After block 430, the routine continues to block 440 to perform a Relevant Document Determination Manager routine to determine particular documents of the domain that are relevant to particular terms and themes, with one example of such a routine being illustrated with respect to FIG. 7. After block 440, the routine continues to block 450 to store the determined relevance information and/or to optionally provide the determined relevance information to the requester, such as if the information was determined dynamically in response to a request or is being supplied to accommodate a previous request.

If it is instead determined in block 410 that another type of request or information is received, the routine continues instead to block 460 to determine whether a request has been received to provide determined relevance information for an indicated domain. Such determined relevance information may be provided for various reasons and at various times, such as in response to a search request or as part of assisting a user in specifying information regarding one or more themes of interest, as well as in various manners (e.g., as part of a Web page or other information screen provided to a user for display or other presentation on a client device of the user). If it is determined in block 460 that a request has been received to provide determined relevance information for an indicated domain, the routine continues to block 465 to determine whether the requested relevance information has already been determined and stored for later use in blocks 415-450, or if some or all of the requested relevance information is to be dynamically generated. In other embodiments, such a determination may not be made, such as if relevance information provided in response to such requests is always previously determined and stored, or is always dynamically determined. In the illustrated embodiment, if it is determined in block 465 to use stored relevance information, the routine continues to block 470 to obtain the requested relevance information from information that was previously determined and stored.

In addition, the actions of block 470 may be performed in various manners in various embodiments. For example, in some embodiments at least some types of determined relevance information may be available to only a subset of users or other entities who are authorized to receive the information, and if so the actions for one or more of blocks 460-475 may further include determining whether the requester is authorized to receive the requested information (e.g., has provided an appropriate fee for paid access to the information, has a particular identity that is verified as being authorized to receive confidential requested information, etc.). In addition, requests may be received and information may be provided in various manners, including in electronic messages or via programmatic interactions using one or more APIs provided by the DSRD service, such as by an affiliated service. Alternatively, a Web-based request may be received from a user (e.g., based a Web-based information search GUI or other GUI provided by the DSRD service or other affiliated service), and the requested information may be supplied to the user as part of one or more generated Web pages that are sent in response to the request.

If it is instead determined in block 465 to dynamically obtain at least some of the requested relevance information, the routine continues instead to block 475 to perform the dynamic obtaining of the information. In particular, as is illustrated in the example routine 400, the performance of block 475 may include executing one or more of the other routines corresponding to blocks 420-440 and obtaining resulting information from the routines. In addition, while not illustrated here, in some embodiments the performance of block 475 may further include obtaining documents or other content to be analyzed, such as by initiating performance of block 415 as well, or instead such content to be used may be received in block 405 and provided to one or more of the routines corresponding to blocks 420-440 as part of the performance of block 475. After blocks 470 or 475, the routine continues to block 480 to provide the obtained information to the user or other requester, which may be performed in various manners in various embodiments, as discussed in greater detail elsewhere. Furthermore, it will be appreciated that the performance of block 480 may involve multiple interactions with the user or other requester in at least some situations, such as to initially provide some information, and to later provide additional information or perform other interactions with the user or other requester based on actions taken by the user or other requester after the initial provision of information. After block 475, the routine continues to block 480 to optionally obtain or determine feedback from the use of the provided relevance information by the user or other requester, and if so retains the feedback in the illustrated embodiment for later use in performing learning actions to improve previously determined relevance information—in other embodiments, the routine may instead immediately use any such obtained feedback in at least some situations, such as to re-perform the routines corresponding to one or more of blocks 420-440 using the feedback information.

If it is instead determined in block 460 that a request has not been received to provide determined relevance information for an indicated domain, the routine continues instead to block 490 to perform one or more other indicated operations as appropriate. For example, domain-specific content may be received in block 490 and stored for later analysis, such as information for a new domain to be analyzed and/or new or updated information for a domain for which relevance information was previously determined. Alternatively, other types of information may be received and used in block 490, such as feedback information related to the use of previously determined relevance information, and may be used in various manners. For example, if one or more predefined criteria are satisfied by the feedback received in block 490 and/or stored in block 485 (e.g., based on a minimum or maximum amount of feedback that is obtained, a minimum or maximum amount of time since a previous determination of corresponding relevance information, etc.), the performance of block 490 may trigger an additional performance of the routines corresponding to one or more of blocks 420-440 using the feedback information in order to learn and update previously determined relevance information, as described in greater detail elsewhere. In addition, other types of requests may be received and processed in block 490, such as requests to update previously determined relevance information (e.g., based on subsequent feedback information, subsequent additional domain-specific content that is available, etc.), such as a request from a user or other entity with which the DSRD service interacts or from a human operator of the DSRD service. Similarly, various administrative requests from a human operator of the DSRD service may be received and processed.

After blocks 450, 485 or 490, the routine continues to block 495 to determine whether to continue, such as until an explicit indication to terminate is received. If it is determined to continue, the routine returns to block 405, and if not continues to block 499 and ends.

Figure 5:
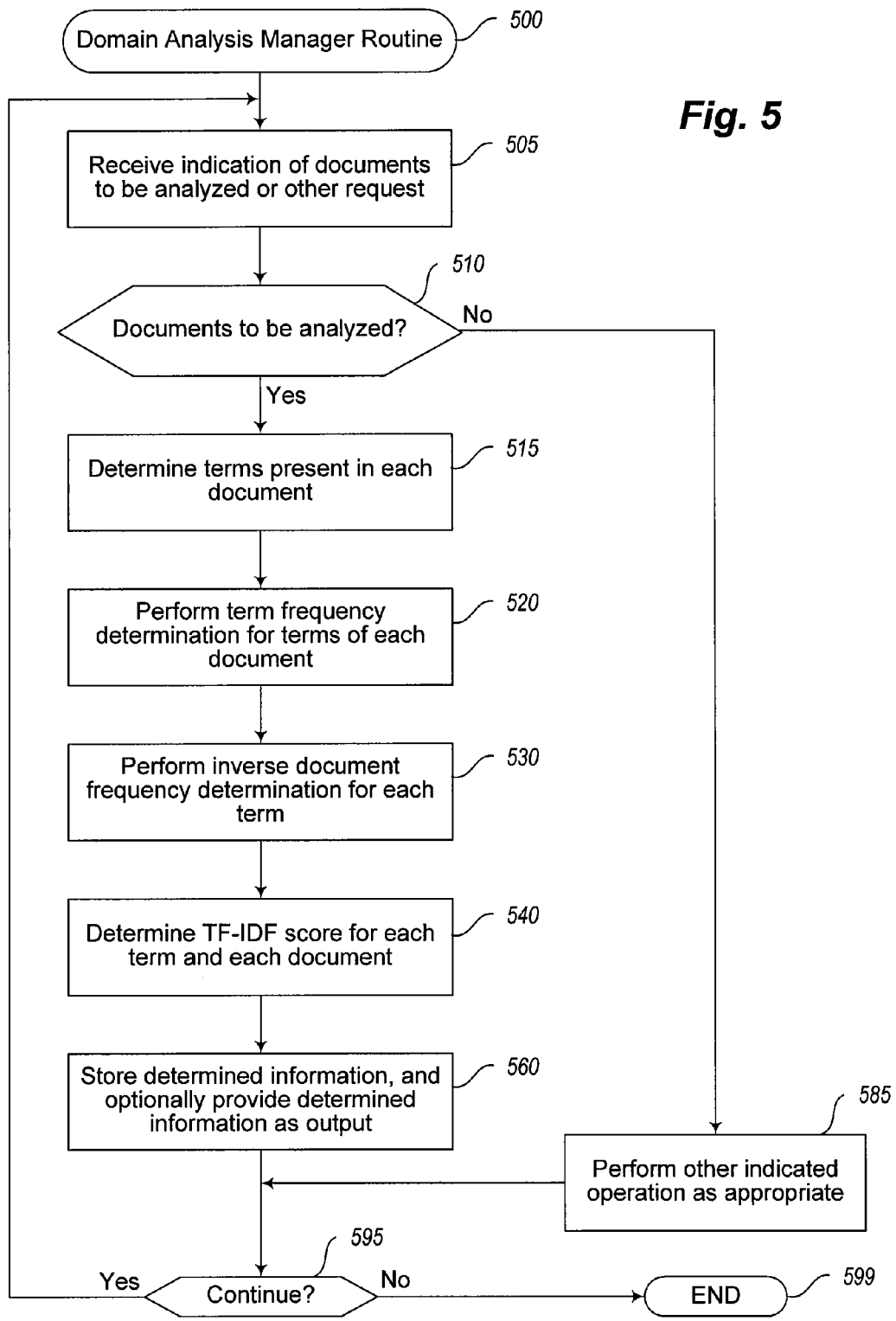
FIG. 5 illustrates a flow diagram of an example embodiment of a Domain Analysis Manager routine.

FIG. 5 is a flow diagram of an example embodiment of a Domain Analysis Manager routine 500. The routine may be provided by, for example, execution of the Domain Analysis Manager module 110 of the DSRD service 105 of FIG. 1A and/or a module of the DSRD system 340 of FIG. 3, such as to analyze domain-specific content for a domain in order to determine the use of particular terms in particular documents and across the group of all the documents. In addition, in at least some situations, the routine 500 may be performed based on execution of block 420 of FIG. 4. In this example, the routine 500 is performed with respect to an initial analysis of domain-specific content for a domain, but in other embodiments may be similarly performed to update previously analyzed information, such as to analyze additional documents that become available for a domain after a prior analysis of other documents has been completed. Furthermore, in a manner similar to that of the other routines, the routine 500 may determine term analysis information for a domain in advance of the use of that determined information, as well as dynamically in response to a request for such information.

The illustrated embodiment of the routine begins in block 505, where an indication of documents to be analyzed for a domain or another request is received. The routine continues to block 510 to determine whether documents to be analyzed were received. If so, the routine continues to block 515 to analyze each of the documents to determine terms that are present in the documents. In addition, as discussed in greater detail elsewhere, the determination of terms for a document may include a variety of types of term processing in various embodiments, such as to normalize terms (e.g., using term stemming to combine related terms), to remove common terms (e.g., "the", "a", "an", "of", "and", etc.) or other indicated terms, to aggregate multiple words together into single terms for purposes of the later analysis, to generate an index of the terms in the document, etc. After block 515, the routine continues to block 520 to perform a term frequency determination for the terms of each document, and in block 530 performs an inverse document frequency determination for each term across all of the documents. In block 540, the routine then determines a TF-IDF score for each term and document combination based on the information generated in blocks 520 and 530. After block 540, the routine continues to block 560 to store the determined information for later use, and to optionally provide the determined information as output (e.g., as a response to a dynamic invocation of the routine 500 for the determined information, such as with respect to block 475 of FIG. 4; or for use by the Relevant Theme Determination Manager routine 600 of FIG. 6 and/or the Relevant Document Determination Manager routine 700 of FIG. 7, such as corresponding to blocks 430 and/or 440 of FIG. 4).

If it is instead determined in block 510 that documents to be analyzed were not received, the routine continues instead to block 585 to perform one or more other indicated operations as appropriate. For example, the other operations may include receiving and responding to requests for previously generated document term analysis information, to requests to update previously determined document analysis information to reflect new domain-specific content that is available, to administrative requests from a human operator of the DSRD service, etc.

After blocks 560 or 585, the routine continues to block 595 to determine whether to continue, such as until an explicit indication to terminate is received. If it is determined to continue, the routine returns to block 505, and if not continues to block 599 and ends.

Figure 6:
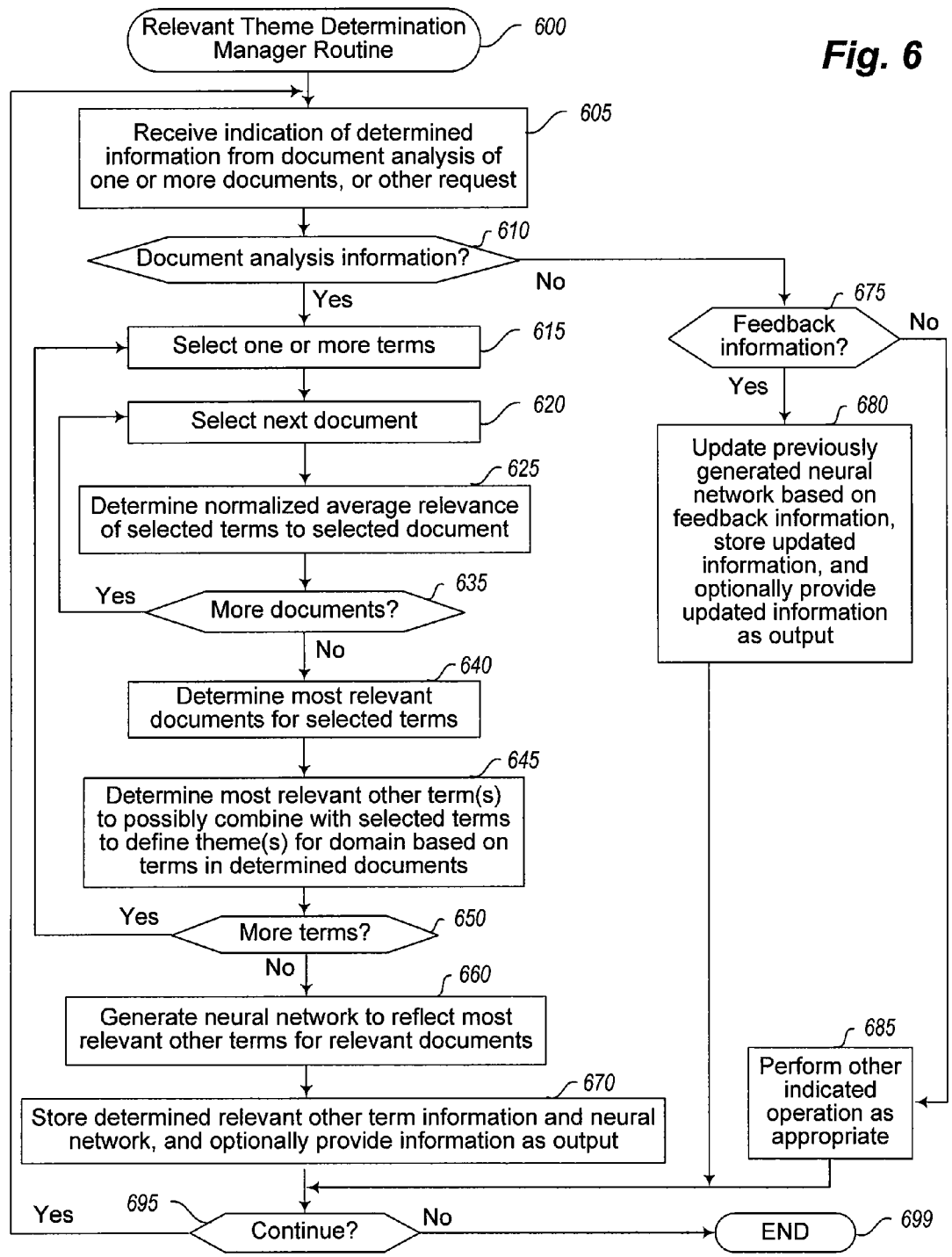
FIG. 6 illustrates a flow diagram of an example embodiment of a Relevant Theme Determination Manager routine.

FIG. 6 is a flow diagram of an example embodiment of a Relevant Theme Determination Manager routine 600. The routine may be provided by, for example, execution of the Relevant Theme Determination Manager module 130 of FIG. 1A and/or a module of the DSRD system 340 of FIG. 3, such as to use document term analysis information for documents of a domain to determine relationships between terms and possible themes for the domain. The routine 600 may be initiated by, for example, execution of block 430 of FIG. 4, or instead in other manners. In addition, the illustrated embodiment of the routine describes an initial determination of relevant theme-related information for a domain, as well as updating previously determined theme-related relevance information to reflect subsequent feedback and/or other information about possible themes for the domain. Furthermore, in a manner similar to that of the other routines, the routine 600 may determine theme-related relevance information for a domain in advance of the use of that determined relevance information, as well as dynamically in response to a request for such information.

Figure 7:
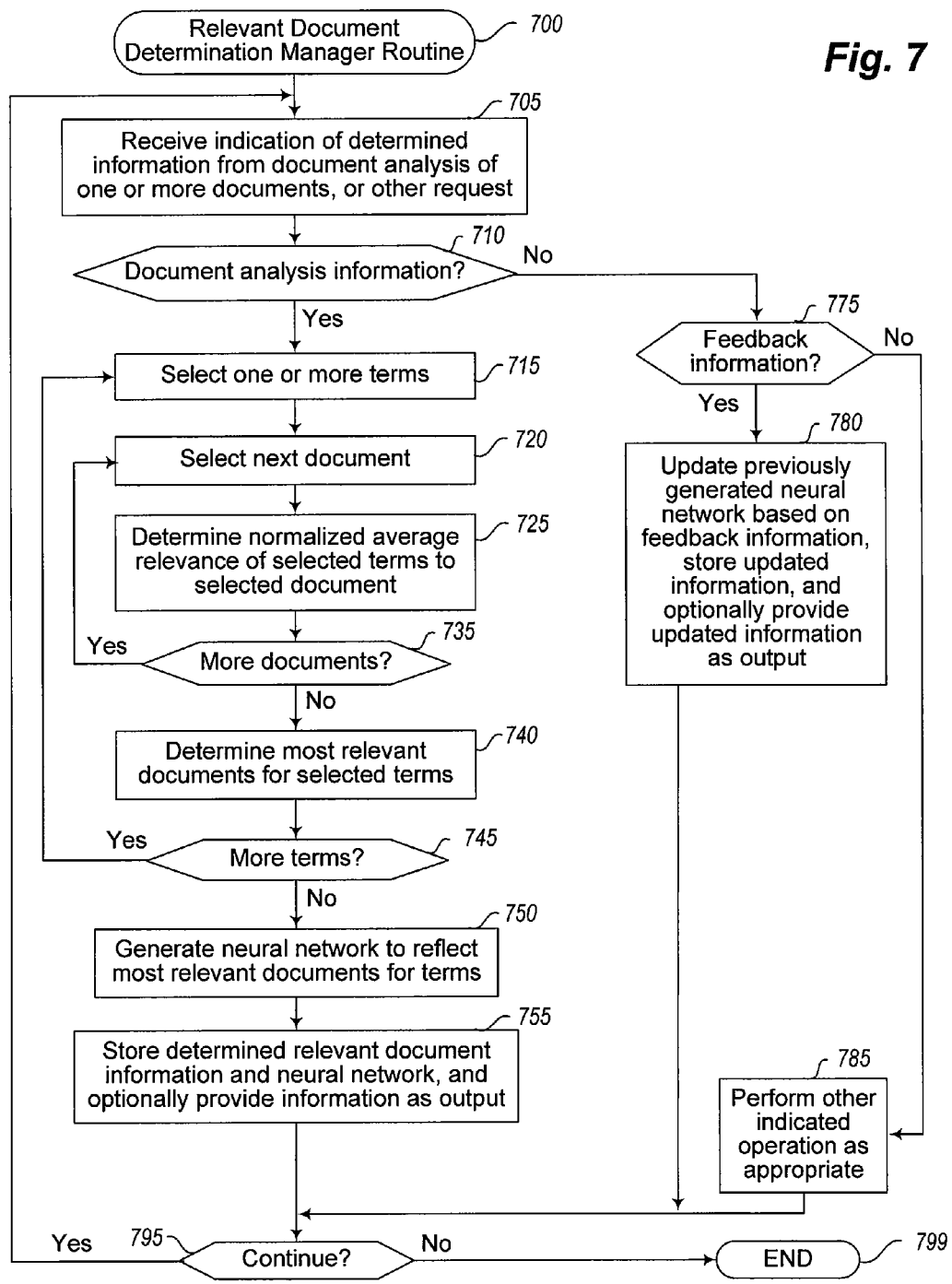
FIG. 7 illustrates a flow diagram of an example embodiment of a Relevant Document Determination Manager routine.

In addition, in the illustrated embodiment, the determination of theme-related relevance information for a domain in FIG. 6 is illustrated as being performed separately from the determination of document-related relevance information for the domain in FIG. 7, although in other embodiments the determination of such types of relevance information may be performed in other manners. For example, only one of theme-related relevance information and document-related relevance information may be determined in a particular embodiment, the determination of both theme-related and document-related relevance information for a domain may be performed together as part of a single routine, information that is common to both types of determinations may be performed once and then shared between two distinct routines, etc.

The illustrated embodiment of the routine begins at block 605, where document term analysis information for the documents of a domain is received (e.g., as output of routine 500 of FIG. 5, as information supplied as part of a dynamic determination request, etc.), or another request is received. The routine continues to block 610 to determine if document term analysis information is received, and if so continues to block 615. In the illustrated embodiment, blocks 615-650 are performed to determine theme-related information for each group of one or more terms of the domain that are of interest. Terms to be analyzed may be selected by, for example, using each term present in any of the documents (optionally excluding common terms and/or other indicated terms). Alternatively, the groups of terms to be analyzed may include, for example, each combination of two terms or of another indicated quantity of terms that are present in the documents of the domain, each combination of two terms or of another indicated quantity of terms that are determined to be sufficiently potentially related to each other (e.g., above a specified threshold), etc. In addition, the blocks 615-650 may be performed repeatedly to evaluate and revise information about the inter-relatedness of multiple terms, such as to initially perform the blocks 615-650 for each term individually, to next perform the determination for at least some combinations of two terms (e.g., based on information available from the performance of the blocks 615-650 for those terms individually), to next perform the determination for at least some combinations of three terms (e.g., based on information available from the performance of the blocks 615-650 for particular terms that are sufficiently related to previously selected combinations of two terms), etc.

In particular, in the illustrated embodiment, the routine in block 615 selects the next group of one or more terms to be considered, beginning with the first such group, and in block 620 similarly selects the next document of the domain to be considered, beginning with the first document. In block 625, the routine then determines the normalized average relevance of the selected term(s) to the selected document, such as based on averaging or otherwise aggregating normalized TF-IDF scores for each selected term for the selected document. In block 635, the routine then determines whether there are more documents to be analyzed, and if so returns to block 620. Otherwise, the routine continues to block 640 to determine the most relevant documents for the currently selected term(s) based on the relevant scores determined in block 625. Next, in block 645, the routine identifies one or more of the determined most relevant documents, and uses the identified documents to determine other terms that are potentially most relevant to the selected term(s), such as based on the term frequency of those other terms in the identified document(s) or other indication of the relevance of those other terms to the identified document(s).

In addition, in some embodiments, the other terms that are determined to be most relevant to the selected term(s) may optionally be combined with the one or more of the selected term(s) for possible use as a theme and/or for possible later analysis with respect to blocks 615-650 for the combined group of those terms, such as to optionally find additional other terms that may be related to that combined group of terms. Such an ongoing analysis of possible relationships of additional other terms to currently selected terms may be performed in various manners, such as by individually combining the group of selected terms with each of the most relevant other terms, with all of the most relevant other terms, with some or all sub-combinations of the most relevant other terms, etc. Alternatively, in other embodiments, some or all of the most relevant other terms may be combined with some or all of the selected terms to identify possible themes in other manners, and/or later feedback from the use of terms together by users may be used to refine which groups of terms are related together as themes for the domain.

After block 645, the routine continues to block 650 to determine if there are more groups of one or more terms to consider, and if so returns to block 615. Otherwise the routine continues to block 660 to, in the illustrated embodiment, generate a neural network to reflect the relevance of terms in the domain to other terms in the domain, such as based in part on the information generated with respect to blocks 625, 640 and 645. As discussed with respect to block 680, such a generated neural network may also later be updated based on feedback to refine the determination of the inter-relatedness of particular terms for the domain. After block 660, the routine continues to block 670 to store the determined relevant theme-related information and the generated neural network, and optionally provides some or all of the determined information as output if appropriate (e.g., as a response to a request to dynamically generate that information).

If it is instead determined in block 610 that document term analysis information is not received, the routine continues instead to block 675 to determine if feedback information is received or determinable, such as based on use of previously determined and provided relevance information. If so, the routine continues to block 680 to use the feedback information to update a previously generated neural network that corresponds to the feedback, as discussed in greater detail elsewhere. The performance of block 680 further stores the updated neural network information, and optionally provides the updated information to a requester as output of the routine. If it is instead determined in block 675 that feedback information is not received, the routine continues instead to block 685 to perform one or more other indicated operations as appropriate. For example, such other indicated operations may include receiving a request to supply previously determined theme-related information for a domain (e.g., the theme-related information from a current version of a particular previously generated neural network for the domain, such as after the neural network has been updated), receiving user feedback information to later use in refining determined theme-related information for the domain (e.g., particular groups of terms that are selected together to represent a theme), receiving a request from a user or other entity or other human operator to perform an update to previously determined theme-related information (e.g., based on user feedback and/or additional domain-specific content that is available for the domain), receiving other administrative requests from a human operator of the DSRD service, etc. Feedback information that is received for later use may be handled in various manners. For example, if one or more predefined criteria are satisfied by the feedback (e.g., based on a minimum or maximum amount of feedback that is obtained, a minimum or maximum amount of time since a previous determination of corresponding relevance information, etc.), the performance of block 685 may trigger a subsequent performance of the routine 600 in which that feedback information is supplied for use in block 680.

After blocks 670, 680 or 685, the routine continues to block 695 to determine whether to continue, such as until an explicit indication to terminate is received. If it is determined to continue, the routine returns to block 605, and if not continues to block 699 and ends.

FIG. 7 is a flow diagram of an example embodiment of a Relevant Document Determination Manager routine 700. The routine may be provided by, for example, execution of the Relevant Document Determination Manager module 120 of FIG. 1A and/or a module of the DSRD system 340 of FIG. 3, such as to use document term analysis information for documents of a domain to determine relationships between terms and documents for the domain. The routine 700 may be initiated by, for example, execution of block 440 of FIG. 4, or instead in other manners. In addition, the illustrated embodiment of the routine describes the initial determination of relevant document-related information for a domain, as well as updating previously determined document-related relevance information to reflect subsequent feedback and/or other information about documents for the domain.

Furthermore, in a manner similar to that of the other routines, the routine 700 may determine document-related relevance information for a domain in advance of the use of that determined relevance information, as well as dynamically in response to a request for such information.

The illustrated embodiment of the routine begins at block 705, where document term analysis information for the documents of a domain is received (e.g., as output of routine 500 of FIG. 5, as information supplied as part of a dynamic determination request, etc.), or another request is received. The routine continues to block 710 to determine if document term analysis information is received, and if so continues to block 715. In the illustrated embodiment, blocks 715-745 are performed to determine document-related information for each group of one or more terms of the domain that are of interest, such as in a manner similar to blocks 615-650 of FIG. 6. Terms to be analyzed may be selected by, for example, using each term present in any of the documents (optionally excluding common terms and/or other indicated terms), or in other manners as described in greater detail with respect to FIG. 6.

In particular, in the illustrated embodiment, the routine in block 715 selects the next group of one or more terms to be considered, beginning with the first such group, and in block 720 similarly selects the next document of the domain to be considered, beginning with the first document. In block 725, the routine then determines the normalized average relevance of the selected term(s) to the selected document, such as based on averaging or otherwise aggregating normalized TF-IDF scores for each selected term for the selected document. In block 735, the routine then determines whether there are more documents to be analyzed, and if so returns to block 720. Otherwise, the routine continues to block 740 to determine the most relevant documents for the currently selected term(s) based on the relevant scores determined in block 725. Next, in block 745, the routine determines if there are more groups of one or more terms to consider, and if so returns to block 715.

Otherwise the routine continues to block 750 to, in the illustrated embodiment, generate a neural network to reflect the relevance of terms in the domain to documents in the domain, such as based in part on the information generated with respect to blocks 725 and 740. As discussed with respect to block 780, such a generated neural network may also later be updated based on feedback to refine the determination of the relatedness of particular terms for the domain to particular documents of the domain. After block 750, the routine continues to block 755 to store the determined relevant document-related information and the generated neural network, and optionally provides some or all of the determined information as output if appropriate (e.g., as a response to a request to dynamically generate that information).

If it is instead determined in block 710 that document term analysis information is not received, the routine continues instead to block 775 to determine if feedback information is received or determinable, such as based on use of previously determined and provided relevance information. If so, the routine continues to block 780 to use the feedback information to update a previously generated neural network that corresponds to the feedback, as discussed in greater detail elsewhere. The performance of block 780 further stores the updated neural network information, and optionally provides the updated information to a requester as output of the routine. If it is instead determined in block 775 that feedback information is not received, the routine continues instead to block 785 to perform one or more other indicated operations as appropriate. For example, such other indicated operations may include receiving a request to supply previously determined document-related information for a domain (e.g., the document-related information from a current version of a particular previously generated neural network for the domain, such as after the neural network has been updated), receiving user feedback information to later use in refining determined document-related information for the domain (e.g., particular documents that are selected for use corresponding to a specified theme or other group of terms), receiving a request from a user or other entity or other human operator to perform an update to previously determined document-related information (e.g., based on user feedback and/or additional domain-specific content that is available for the domain), receiving other administrative requests from a human operator of the DSRD service, etc. Feedback information that is received for later use may be handled in various manners. For example, if one or more predefined criteria are satisfied by the feedback (e.g., based on a minimum or maximum amount of feedback that is obtained, a minimum or maximum amount of time since a previous determination of corresponding relevance information, etc.), the performance of block 785 may trigger a subsequent performance of the routine 700 in which that feedback information is supplied for use in block 780.

After blocks 755, 780 or 785, the routine continues to block 795 to determine whether to continue, such as until an explicit indication to terminate is received. If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:
under control of one or more computing systems configured to provide information about content items determined to be relevant for identified themes,
receiving one or more indications of a first group of multiple content items whose contents are representative of a subject area of interest, and of a second group of multiple content items whose contents are related to the subject area of interest;
automatically analyzing the multiple content items of the first group to identify multiple themes that correspond to the subject area of interest, and automatically assessing degrees of relevance of the multiple content items of the second group to a first of the identified themes;
providing information to one or more users about at least some of the multiple content items of the second group that are identified as each having an assessed degree of relevance to the first identified theme that satisfies one or more indicated criteria, and receiving feedback from the one or more users that reflects a relevance assessed by the one or more users of the identified at least some content items to the first identified theme;
automatically updating the assessed degree of relevance to the first identified theme of each of one or more of the at least some content items of the second group based at least in part on the received feedback; and
providing information to one or more other users about at least one of the at least some content items of the second group based at least in part on the updated assessed degrees of relevance of the at least one content items.

2. The method of claim 1 further comprising:
repeatedly providing additional information to users about at least some of the multiple content items of the second group that are determined to be currently relevant to the first identified theme, the determining of the at least some content items that are currently relevant to the first identified theme being based at least in part on current updated assessed degrees of relevance of those content items to the first identified theme at a time of the providing of the additional information; and
repeatedly, after receiving additional feedback from users that reflects the relevance of the multiple content items of the second group to the first identified theme, further updating the assessed degrees of relevance to the first identified theme of the multiple content items of the second group.

3. The method of claim 1 wherein the automatic assessing of the degrees of relevance of the multiple content items of the second group is further performed for each of at least some of the multiple content items of the second group and each of at least some other of the identified themes, and wherein the method further comprises:
repeatedly providing additional information to users about at least some of the multiple content items of the second group that are determined to be currently relevant to one or more of the at least some other identified themes, the determining of the at least some content items of the second group that are currently relevant to the one or more other identified themes being based at least in part on current updated assessed degrees of relevance of those content items to those identified themes at a time of the providing of the additional information; and
repeatedly, after receiving additional feedback from users that reflects the relevance of the at least some content items of the second group to the at least some other identified themes, further updating the assessed degrees of relevance to the at least some other identified themes of the at least some content items of the second group.

4. The method of claim 1 wherein the automatically assessed degrees of relevance of the multiple content items of the second group to the first identified theme reflect initial assessments of those degrees of relevance, wherein the method further comprises automatically generating an adaptive model that represents the automatically assessed degrees of relevance of the multiple content items of the second group to the first identified theme, the generating of the adaptive model being performed such that the generated adaptive model initially models the initial assessments of the degrees of relevance of the multiple content items of the second group to the first identified theme, and wherein the automatic updating of the assessed degree of relevance to the first identified theme of each of the one or more content items of the second group based at least in part on the received feedback includes updating the generated adaptive model so that it represents the updated assessed degrees of relevance.

5. The method of claim 4 further comprising:
repeatedly providing additional information to users about at least some of the multiple content items of the second group that are determined to be currently relevant to the first identified theme, the determining of the at least some content items that are currently relevant to the first identified theme being based at least in part on using a current version of the updated adaptive model at a time of the providing of the additional information to determine current updated assessed degrees of relevance of those content items to the first identified theme; and
repeatedly, after receiving additional feedback from users that reflects the relevance of the multiple content items of the second group to the first identified theme, further updating the generated adaptive model so that it represents further updated assessed degrees of relevance to the first identified theme of the multiple content items of the second group.

6. The method of claim 4 wherein the content items are documents, wherein the generated adaptive model is a document relevance neural network, and wherein the updating of the generated adaptive model is performed using automated learning via back propagation.

7. The method of claim 4 wherein the first identified theme includes one or more terms that are part of the contents of one or more of the multiple content items of the first group.

8. The method of claim 1 wherein the automatic analyzing of the multiple content items of the first group to identify the multiple themes includes identifying a plurality of terms that are included in the contents of the multiple content items of the first group, and includes determining a relevance of each of at least some of the plurality of terms to at least some of the multiple content items of the first group, wherein the first identified theme and at least some other of the identified themes each include at least one of the plurality of terms, and wherein the automatic assessing of the degrees of relevance of the multiple content items of the second group to the first identified theme is based at least in part on a determined relevance of the at least one term of the first identified theme to the contents of the multiple content items of the second group.

9. The method of claim 8 wherein the first identified theme includes multiple of the plurality of terms that are determined to be related.

10. The method of claim 1 wherein the automatic analyzing of the multiple content items of the first group to identify the multiple themes includes determining a relevance between each of one or more of a plurality of terms related to the subject area of interest and each of one or more other of the plurality of terms, and wherein the first identified theme includes multiple terms that have a determined relevance between each other that exceeds a threshold.

11. The method of claim 1 wherein the automatic analyzing of the multiple content items of the first group to identify the multiple themes further includes determining a relevance between at least one term that is part of the first identified theme and each of multiple other terms that are not part of the first identified theme, and wherein the method further comprises providing information to one or more users about at least one of the multiple other terms for possible inclusion with the at least one term as part of the first identified theme, the at least one other terms each being selected for the provided information based at least in part on a determined relevance between the at least one term of the first identified theme and that other term.

12. The method of claim 1 wherein the automatic analyzing of the multiple content items of the first group to identify the multiple themes further includes determining a relevance between at least one term that is part of the first identified theme and each of multiple other terms that are not part of the first identified theme, wherein the received feedback from the one or more users further reflects a relevance between the at least one term of the first identified theme and at least one of the multiple other terms, and wherein the method further comprises automatically determining to update the first identified theme to include one or more of the at least one other terms based at least in part on the relevance further reflected in the received feedback.

13. The method of claim 1 wherein the automatic analyzing of the multiple content items of the first group to identify the multiple themes includes identifying a plurality of terms that represent the multiple content items of the first group, wherein the first identified theme includes multiple of the plurality of terms that are determined to be relevant to each other, and wherein at least one of the multiple terms of the first identified theme corresponds to at least one attribute of at least one of the multiple content items of the first group that is not part of the contents of the multiple content items of the first group.

14. The method of claim 13 wherein the at least one attribute of the at least one content items of the first group that is not part of the contents of the multiple content items of the first group include at least one of a type of the at least one content items and a source of the at least one content items.

15. The method of claim 1 wherein the providing of the information to the one or more users is performed in response to an indication from at least one of the one or more users of the first identified theme.

16. The method of claim 15 wherein the first identified theme includes at least one term that represents one or more of the multiple content items of the first group, and wherein the indication from the at least one user of the first identified theme includes an indication of one or more of the at least one terms.

17. The method of claim 15 wherein the providing of the information to the one or more users further includes providing additional information about one or more of the multiple identified themes, the one or more themes including the first identified theme, and wherein the indication from the at least one user of the first identified theme includes a selection by the at least one users of the first identified theme from the provided additional information.

18. The method of claim 1 wherein the feedback received from the one or more users is based on one or more actions by the one or more users in selecting at least one of the at least some content items for further use, such that the relevance assessed by the one or more users of the identified at least some content items to the first identified theme is automatically inferred from the one or more actions.

19. The method of claim 1 wherein the feedback received from the one or more users is based on a selection by at least one of the one or more users of at least one of the at least some content items as being confirmed to be relevant to the first identified theme.

20. The method of claim 1 wherein the one or more computing systems are configured to provide a relevance determination system that performs the providing of the information about the content items having the contents determined to be relevant for the identified themes, and wherein the providing of the information to the one or more users includes providing that information to another service that interacts with the one or more users to complete the providing of the information to the one or more users.

21. The method of claim 1 wherein at least some of the content items of the first and second groups are each a textual document, and wherein the first identified theme includes one or more words that are included in the contents of at least one of the content items of the first group.

22. The method of claim 21 wherein the at least some content items of the first and second groups are each a Web page.

23. The method of claim 21 wherein the at least some content items of the first and second groups are each an electronic message.

24. The method of claim 21 wherein the first identified theme includes multiple words, the multiple words including one or more correctly spelled words and one or more misspelled words such that each of the misspelled words corresponds to at least one of the correctly spelled words.

25. The method of claim 1 wherein at least some of the content items of the first and second groups include at least one of audio information, image information, video information, and biological information, and wherein the first identified theme includes one or more attributes of at least one of the content items of the first group.

26. The method of claim 1 wherein at least some of the content items of the first and second groups include at least one of alphanumeric data structures, symbolic data structures, and mathematical data structures.

27. The method of claim 1 wherein at least some of the content items of the first and second groups are each a fragment of a document.

28. The method of claim 1 wherein the content items of the first group are specific to a first user, such that the identifying of the multiple themes is performed in a manner specific to the first user.

29. The method of claim 28 wherein the content items of the second group are specific to the first user, such that the assessing of the degrees of relevance of the multiple content items of the second group is performed in a manner specific to the first user.

30. The method of claim 1 wherein the identified multiple themes each correspond to one of multiple alternative types of data used in the subject area of interest, and wherein the at least some content items of the second group are each identified as being of the type of data corresponding to the first identified theme.

31. The method of claim 1 wherein the identified multiple themes each correspond to one of multiple alternative categories of content of the multiple content items of the first group, and wherein the at least some content items of the second group are each identified as having the category of content corresponding to the first identified theme.

32. The method of claim 1 wherein the providing of the information about the content items having the contents determined to be relevant for the identified themes is performed for each of one or more other subject areas that each have multiple content items related to that subject area that are analyzed to identify other themes that correspond to that subject area and for which degrees of relevance are automatically assessed to at least one of the identified other themes.

33. The method of claim 1 wherein the multiple content items of the first group are distinct from the multiple content items of the second group.

34. The method of claim 1 wherein the multiple content items of the second group include at least some of the multiple content items of the first group.

35. A non-transitory computer-readable medium whose contents configure a computing system to execute a relevance determination system that provides information about determined relevance related to identified themes, by performing a method comprising:
    automatically analyzing contents of a plurality of related content items in order to identify multiple themes in the contents and to assess relevance of at least one of the plurality of content items to at least one of the identified themes;
    receiving information about one or more actions of one or more external entities that provide feedback regarding relevance of one or more of the plurality of content items to one or more of the identified themes;
    automatically updating the assessed relevance of the at least one content items to the at least one identified themes based at least in part on the feedback provided by the received information; and
    providing information that is based at least in part on the updated assessed relevance of the at least one content items.

36. The non-transitory computer-readable medium of claim 35 wherein the plurality of content items includes a first group of multiple documents whose contents are representative of a subject area and a second group of multiple documents whose contents are related to the subject area, wherein the automatic analyzing of the contents of the plurality of content items includes analyzing the multiple documents of the first group to identify the multiple themes and includes assessing degrees of relevance of the multiple documents of the second group to a first of the multiple identified themes, wherein the receiving of the information that provides the feedback is in response to providing information to the one or more external entities about at least some of the multiple documents of the second group that are identified as each having an assessed degree of relevance to the first identified theme that satisfies one or more indicated criteria, wherein the at least one content items whose assessed relevance is updated are each one of the multiple documents of the second group, and wherein the providing of the information that is based at least in part on the updated assessed relevance of the at least one content items includes providing information related to one or more of the plurality of content items to at least one entity other than the one or more entities whose actions provide the feedback.

37. The non-transitory computer-readable medium of claim 36 wherein the one or more external entities are each a human user that is not affiliated with the relevance determination system.

38. The non-transitory computer-readable medium of claim 35 wherein at least some of the identified multiple themes each includes multiple terms, wherein the automatic analyzing of the contents of the plurality of content items in order to identify the multiple themes in the contents includes, for each of the at least some themes, automatically determining an assessed relevance of the multiple terms included in the theme to each other, wherein the received information further provides feedback regarding relevance of the multiple terms included in one or more of the at least some themes to each other, and wherein the method further comprises automatically updating the assessed relevance of the multiple terms included in each of the one or more themes based at least in part on the feedback further provided by the received information, and providing information that is based at least in part on the updated assessed relevance of the multiple terms included in at least one of the one or more themes.

39. The non-transitory computer-readable medium of claim 35 wherein the computer-readable medium is a memory of the configured computing system on which the contents are stored.

40. The non-transitory computer-readable medium of claim 35 wherein the contents are instructions that when executed program the configured computing system to perform the method.

41. A computing system configured to provide information about determined relevance related to identified themes, comprising:
one or more processors; and
a relevance determination system that is configured to, when executed by at least one of the one or more processors, provide information about determined relevance related to identified themes by:
automatically analyzing contents of a plurality of related content items in order to identify multiple themes in the contents, at least some of the identified multiple themes each including multiple terms, the identifying of each of one or more of the at least some themes including automatically assessing relevance of the multiple terms included in the theme to each other;
providing information related to one or more of the at least some identified themes to facilitate specification by a first user of at least one theme of interest; and
after receiving an indication of the at least one theme of interest specified by the first user, providing information for use by the first user that is related to the specified at least one theme of interest.

42. The computing system of claim 41 wherein the at least one theme is specified by the first user based on a selection of the first user from among the one or more identified themes to which the provided information relates, wherein the plurality of related content items includes a first group of multiple documents whose contents are representative of a subject area and a second group of multiple documents whose contents are related to the subject area, wherein the automatic analyzing of the contents of the plurality of content items includes analyzing the multiple documents of the first group to identify the multiple themes and includes assessing degrees of relevance of each of the multiple documents of the second group to the specified at least one theme, and wherein the information provided for use by the first user that is related to the specified at least one theme of interest includes information about at least one of the multiple documents of the second group that is selected based at least in part on the assessed degree of relevance of each of the selected at least one documents to the specified at least one theme.

43. The computing system of claim 42 wherein the providing of the information about the determined relevance related to the identified themes by the relevance determination system further includes:
receiving information about one or more actions of one or more users that provides feedback regarding relevance of the multiple terms included in one or more of the at least some themes to each other;
automatically updating the assessed relevance of the multiple terms included in each of the one or more themes based at least in part on the feedback provided by the received information; and
providing information that is based at least in part on the updated assessed relevance of the multiple terms included in at least one of the one or more themes.

44. The computing system of claim 43 wherein the provided information related to the one or more themes contains multiple terms that are included in the one or more themes, wherein the one or more users whose actions provide the feedback include the first user, wherein the one or more actions of the one or more users include the selection by the first user from the one or more identified themes, the selection by the first user including a selection of one or more of the multiple terms contained in the provided information, and wherein the providing of the information that is based at least in part on the updated assessed relevance of the multiple terms included in the at least one themes includes providing information related to one or more of the multiple documents of the second group to at least one user other than the one or more users whose actions provide the feedback.

45. The computing system of claim 41 wherein the providing of the information related to the one or more themes includes providing information to the first user about multiple themes from which the first user selects the specified at least one theme of interest.

46. The computing system of claim 41 wherein the automatic analyzing of the contents of the plurality of content items includes assessing relevance of at least one of the plurality of content items to at least one of the identified themes, and wherein the providing of the information about the determined relevance related to the identified themes by the relevance determination system further includes receiving information that provides feedback regarding relevance of one or more of the plurality of content items to one or more of the identified themes, automatically updating the assessed relevance of the one or more content items to the one or more identified themes based at least in part on the feedback provided by the received information, and providing information that is based at least in part on the updated assessed relevance of the one or more content items.

47. The computing system of claim 41 wherein the relevance determination system includes software instructions for execution by the at least one processors.

48. The computing system of claim 41 wherein the relevance determination system consists of a means for providing information about determined relevance related to identified themes, by:
automatically analyzing contents of a plurality of related content items in order to identify multiple themes in the contents, at least some of the identified multiple themes each including multiple terms, the identifying of each of one or more of the at least some themes including automatically assessing relevance of the multiple terms included in the theme to each other;
providing information related to one or more of the at least some identified themes to facilitate specification by a first user of at least one theme of interest; and
after receiving an indication of the at least one theme of interest specified by the first user, providing information for use by the first user that is related to the specified at least one theme of interest.

* * * * *